(12) United States Patent
Katayama et al.

(10) Patent No.: US 6,404,936 B1
(45) Date of Patent: *Jun. 11, 2002

(54) SUBJECT IMAGE EXTRACTION METHOD AND APPARATUS

(75) Inventors: Tatsushi Katayama, Tokyo; Masakazu Matsugu, Chiba; Koji Hatanaka, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,976

(22) Filed: Dec. 12, 1997

(30) Foreign Application Priority Data

Dec. 20, 1996 (JP) ............................... 8-341198

(51) Int. Cl.[7] ................................. G06K 9/20
(52) U.S. Cl. ...................... 382/283; 382/199; 345/626; 348/586
(58) Field of Search ................................ 382/282–283, 382/197–199, 173, 180, 171–179; 348/586–587; 358/450–453, 537–538, 540; 345/434, 626

(56) References Cited

U.S. PATENT DOCUMENTS 4,887,302 A * 12/1989 Urushibata .................. 382/180
5,048,099 A * 9/1991 Lee .............................. 382/175
5,119,440 A * 6/1992 Duenyas et al. ............. 382/199
5,355,446 A 10/1994 Maayan ....................... 345/626
6,167,167 A * 12/2000 Matsugu et al. ............. 382/283

FOREIGN PATENT DOCUMENTS

| EP | 0 532 823 A2 | 3/1993 | ........... G06F/15/68 |
| EP | 0 817 495 A2 | 1/1998 | ............ H04N/7/26 |

OTHER PUBLICATIONS

U.S. Patent Application Serial No. 08/886,076, Filed Jul. 2, 1997, M. Matsugo, et al.

U.S. Patent Application Serial No. 08/972,166, Filed Nov. 17, 1997, M. Matsugo, et al.

* cited by examiner

Primary Examiner—Leo Boudreau
Assistant Examiner—Ishrat Sherali
(74) Attorney, Agent, or Firm—Peter Zura; Morgan & Finnegan, LLP

(57) ABSTRACT

There is disclosed a method of extracting the region of a subject image from an input image including the subject image. A subject region mask for masking the region of the subject image is generated, and the contour of the subject region mask is shaped. After local regions for correcting the contour shaped by contour shaping are set on the basis of information of the contour of the subject region mask before and after contour shaping, the contour of the shaped subject region mask is corrected within the set local regions.

18 Claims, 30 Drawing Sheets

FIG.2
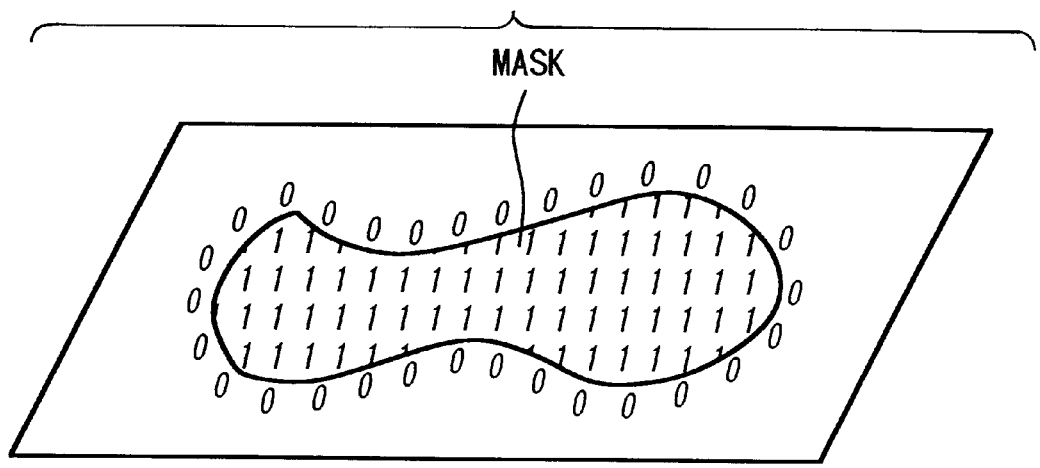
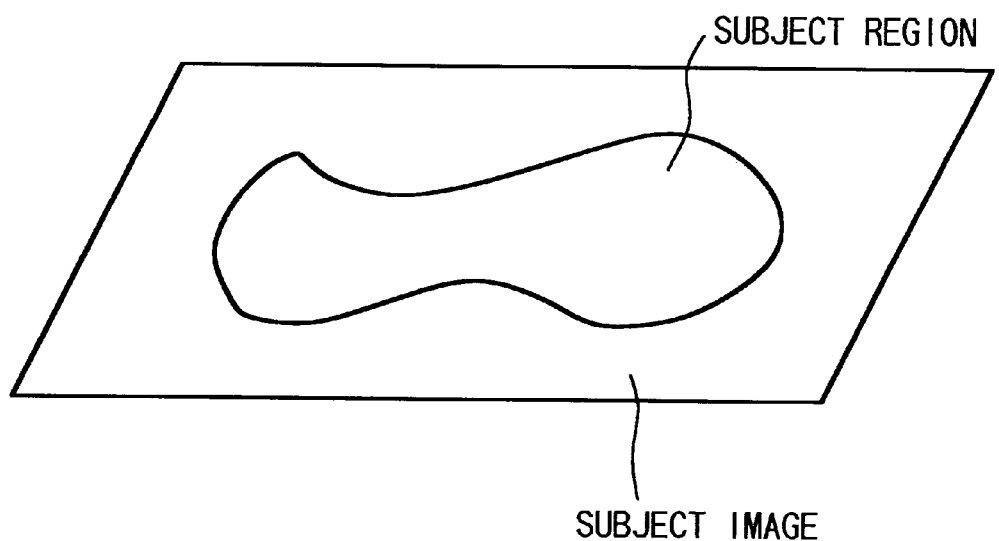

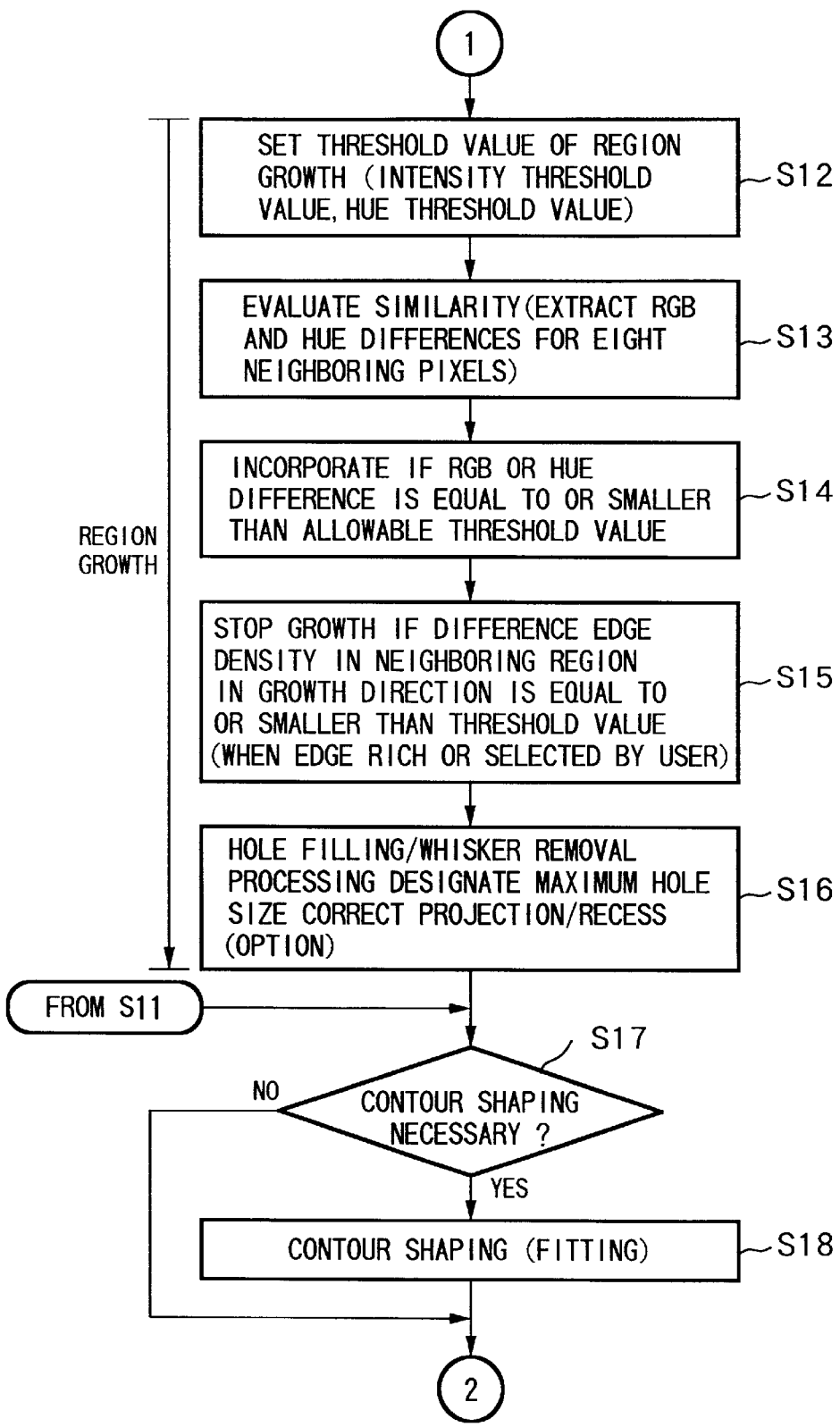

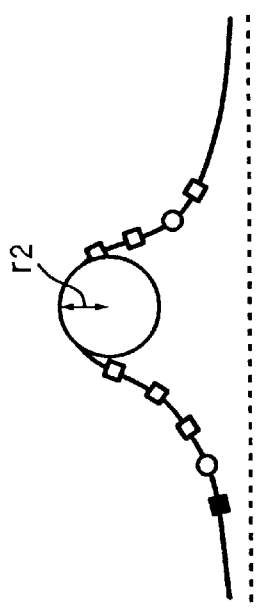
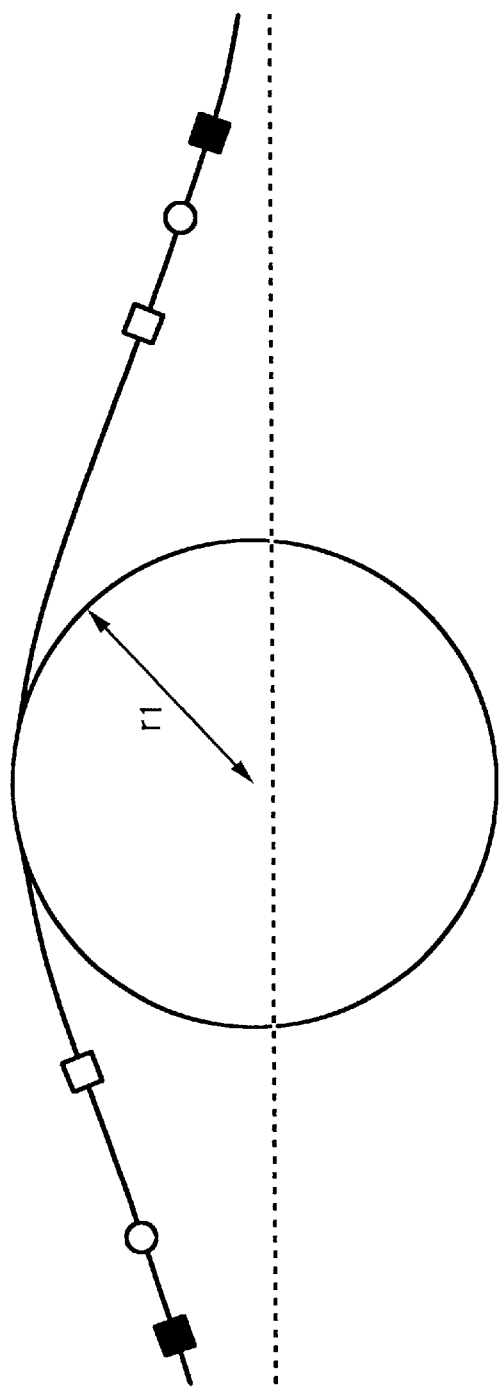
FIG.9A
FIG.9B

SUBJECT REGION MASK
AFTER REGION GROWTH

CONTOUR BEFORE CORRECTION

LOCAL REGION B

AFTRER CORRECTION

SAMPLE POINTS

CONTOUR AFTER CORRECTION

CONTOUR BEFORE CORRECTION

LOCAL REGION B

CONTOUR AFTER CORRECTION

LOCAL REGION B

CONTOUR BEFORE CORRECTION

CONTOUR AFTER CORRECTION

SUBJECT IMAGE EXTRACTION METHOD AND APPARATUS

BACKGROUND OF THE INVENTION

The present invention relates to a subject image extraction method and apparatus for extracting a desired subject image from an image.

In the image of a commodity on a catalog, advertisement, or the like, a desired commodity region alone is often extracted by erasing the surrounding background portion. Image processing software that implements such processing on a computer is known.

As a method of automatically extracting a desired subject region from image data by digital image processing on a computer, a method of extracting regions having nearly equal hue values as a desired subject region while paying attention to hue information included in the desired subject region, a method of preparing two images, i.e., an image of a background alone, and an image including both a subject and the background, and extracting the subject region on the basis of difference information between these two images, and the like are available. However, in either method, the contour of the extracted image region is incomplete, and correction of the contour is indispensable.

Conventionally, in order to correct a contour on a computer, a method of erasing a contour portion to be corrected by an erasing tool such as an eraser, and thereafter, manually re-drawing a new contour using a pointing device such as a mouse, a method of correcting a contour by changing the shape of a fitting curve, which is generated based on the automatically extracted contour to shape the contour, by dragging and moving the position to be corrected using a mouse, and the like are used.

However, both methods require user's manual correction using the pointing device, resulting in much cumbersome operations. It is, in fact, very hard to smoothly draw a complicated shape or linear shape using a mouse or the like, and incomplete contour portions often remain uncorrected.

SUMMARY OF THE INVENTION

It is an object of the present invention to provide a subject image extraction method and apparatus, which can solve the conventional problems, and can accurately correct the contour of an extracted subject region.

It is another object of the present invention to provide a subject image extraction method and apparatus, which can easily correct the contour of an extracted subject region.

It is still another object of the present invention to provide a subject image extraction method and apparatus, which can locally correct a contour by simple operation.

It is still another object of the present invention to provide a subject image extraction method and apparatus, which can correct the contour of the subject region with a high degree of freedom.

A subject image extraction method or apparatus according to the present invention comprises: subject region mask generation step or means for generating a subject region mask for masking a region of a subject image on the basis of an input image including the subject image; contour shaping step or means for shaping a contour of the subject region mask; local region setting step or means for setting local regions for correcting the contour shaped by the contour shaping step or means on the basis of information of the contour of the subject region mask before and after shaping by the contour shaping step or means; and contour correction step or means for correcting the contour of the subject region mask shaped by the contour shaping step or means within the local regions set by the local region setting step or means.

According to the method or apparatus with the above arrangement, since the local regions to be subjected to contour correction are automatically set in the vicinity of the subject region mask, and correction is executed, contour correction can be accurately and quickly executed. Since sample points for contour shaping are set in accordance with the direction of the contour of the subject region mask, many sample points can be set at points where the direction of the contour changes, and flexible extraction for the contour of a complicated shape can be done.

A subject image extraction method or apparatus according to the present invention comprises: region segmentation step or means for segmenting an input image into a plurality of small regions; labeling step or means for assigning labels to the small regions obtained by the region segmentation step or means to identify them; subject region mask generation step or means for generating a desired subject region mask from the input image; contour shaping step or means for shaping a contour of the subject region mask generated by the subject region mask generation step or means; display step or means for displaying the contour of the subject region mask shaped by the contour shaping step or means to be superimposed on the input image; correction point designation step or means for designating correction points of the contour of the subject region mask shaped by the contour shaping step or means on the displayed image; and contour correction step or means for correcting the contour of the subject region mask by executing local processing in units of labels including the points designated by the correction point designation step or means.

Since local processing is automatically executed in units of labels including points designated upon contour correction, the correction points need not be designated in units of pixels, and the contour need not be manually corrected. As a result, no manual, complicated processing is required, and the contour can be easily corrected.

A subject image extraction method or apparatus according to the present invention comprises: subject region mask generation step or means for generating a desired subject region mask from an input image; display step or means for displaying a contour of the subject region mask generated by the subject region mask generation step or means to be superposed on the input image; local region setting step or means for setting an arbitrary local region for correcting the contour of the subject region mask on a display screen; processing selection step or means for selecting processing to be done in the local region; and correction step or means for correcting the subject region mask in the local region in accordance with the processing selected by the processing selection step or means.

Since desired contour correction can be automatically executed by only selecting a proper tool and roughly setting a region to be corrected in correspondence with the processing contents of contour correction, accurate contour correction can be executed quickly.

Preferably, a local region to be subjected to contour correction is automatically set in the vicinity of the subject region mask to execute correction. In this manner, contour correction can be accurately and quickly executed.

Also, a desired subject region mask is preferably generated on the basis of difference information between a subject image and background image. With this processing, highly reliable, accurate subject extraction can be done.

Sample points for contour shaping are preferably set in accordance with the direction of the contour of the subject region mask. With this processing, since many sample points can be set at points where the direction of the contour changes, flexible extraction for the contour of a complicated shape can be done.

Since the user can arbitrarily select the processing to be executed, various types of subject contours can be flexibly corrected, thus improving extraction accuracy.

Since a local region can be easily set by operating a pointing means, and processing within the local region is done using operation information, correction can be executed at natural intervals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view for explaining a mask used in the first to third embodiments;

FIG. 3B is a flow chart showing subject extraction (mainly, region growth) of the first embodiment;

FIG. 9A is a view for explaining the principle of contour correction of the first embodiment;

FIG. 9B is a view for explaining the principle of contour correction of the first embodiment;

DETAILED DESCRIPTION OF THE INVENTION

Embodiments to which image extraction of the present invention is applied will be described in detail hereinafter with reference to the accompanying drawings. According to these embodiments, the background image is removed from an image (including a background image and subject image) input from a camera to leave the target subject image alone.

<First Embodiment>

Figure 1:
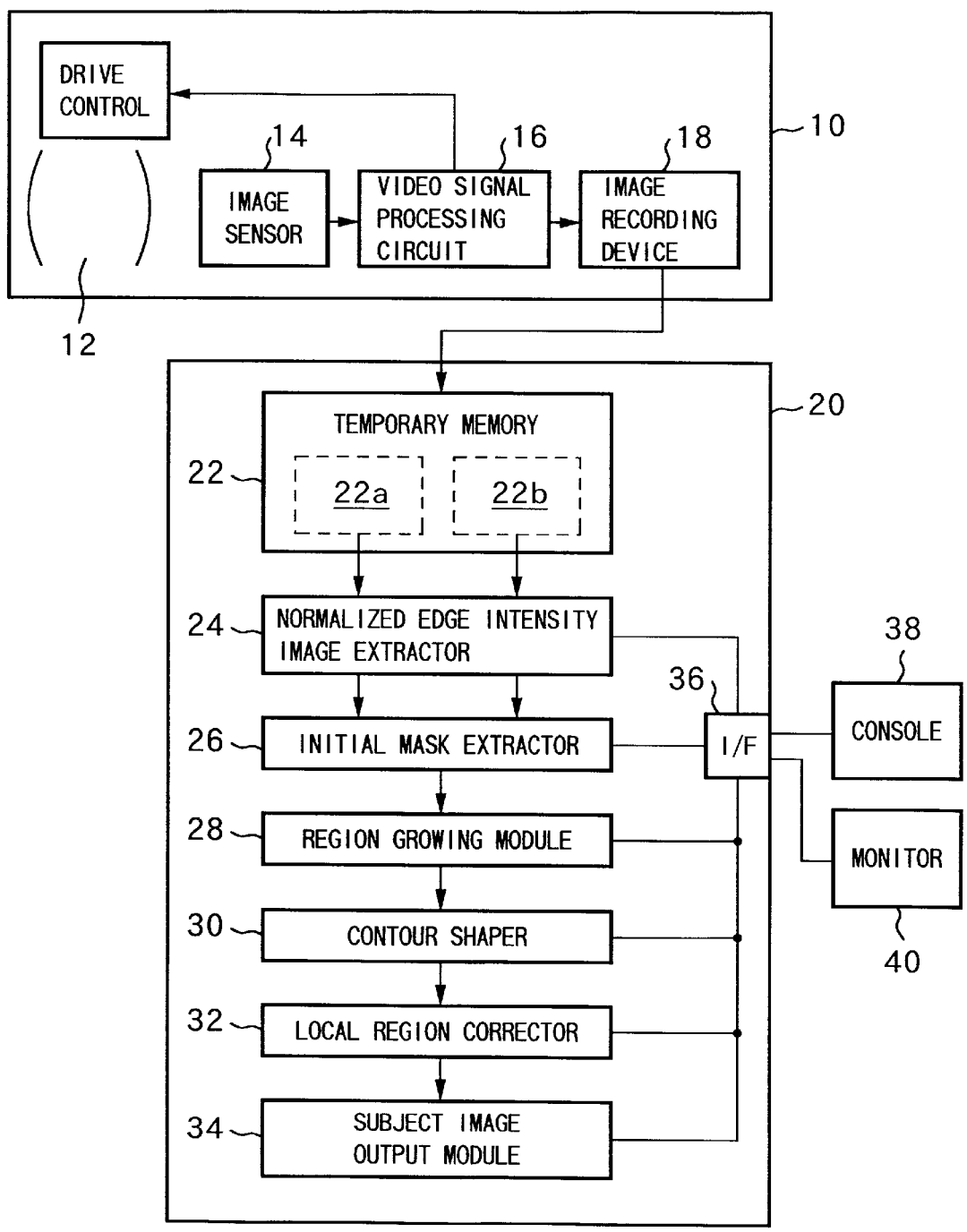
FIG. 1 is a schematic block diagram showing an arrangement according to the first embodiment of the present invention.

FIG. 1 is a schematic block diagram showing the arrangement of an image extraction system of the first embodiment.

The system shown in FIG. 1 comprises a digital camera 10 and an image extraction apparatus (a personal computer or the like) 20.

The camera 10 comprises an imaging optical system 12 including a lens, stop, and their drive control means, an image sensor 14 such as a CCD or the like, a video signal processing circuit 16 for executing gamma (γ) correction, white balance correction, exposure condition control, focusing characteristic control, and the like, and an image recording device 18. The image recording device 18 records a subject image including images of the background and the subject to be extracted.

The image extraction apparatus comprises an image memory 22 including a memory 22a for temporarily storing the subject image and a memory 22b for temporarily storing the background image, a normalized edge intensity image extractor 24 for calculating the edge intensity of an image and normalizing the calculated edge intensity, an initial mask extractor 26 for initially generating a mask region for detecting the subject region, a region growing module 28 for growing the initial region mask to an appropriate one, a contour shaper 30 for shaping the contour of the mask region, a local contour corrector 32 for locally correcting the mask region, a subject image output module 34 for outputting the extracted subject image, an interface module 36, and the like.

Of the constituting elements of the extraction apparatus 20, the image memory 22, normalized edge intensity image extractor 24, initial mask extractor 26, region growing module 28, contour shaper 30, local contour corrector 32, subject image output module 34, and interface module 36 are the same as those disclosed in U.S. patent application Ser. No. 08/886,076, except for the local contour corrector 32. Hence, U.S. patent application Ser. No. 08/886,076 is incorporated herein by reference.

A monitor 40 such as a CRT, and a terminal device (console) 38 such as a personal computer are externally connected to the extraction apparatus 20.

The system of this embodiment extracts a subject region including a subject alone from an image including both a background and the subject (to be referred to as a "subject image" hereinafter), and displays the extracted region on, e.g., the monitor 40. Upon extracting the subject region, a mask is applied to the subject image. The mask is a set of binary data having "1" s at positions corresponding to the subject region, and "0" s at other positions, as shown in FIG. 2. The mask is generated by the normalized edge intensity image extractor 24, initial mask extractor 26, and region growing module 28 shown in FIG. 1. The normalized edge intensity image extractor 24 and initial mask extractor 26 generate an "initial mask", and the region growing module 28 and contour shaper 30 grow the initial mask to improve it into one suited for the subject. The subject image output module 34 applies the improved mask to the subject image (the image including both the subject and background) and outputs image data at pixel positions corresponding to mask values "1", thereby outputting an image of the subject region alone.

Note that the extraction apparatus 20 may be built by hardware shown in FIG. 1. Also, the extraction apparatus 20 may be constituted by a gate array or the above-mentioned hardware functions of this apparatus may be implemented by processing based on program software (e.g., the flow chart shown in FIG. 3A).

The image extraction apparatus of this embodiment is characterized by its individual functions and combinations of these functions rather than its hardware arrangement. Hence, for better understanding of the functions of the apparatus, the following explanation will be given with the aid of flow charts.

Figure 3A:
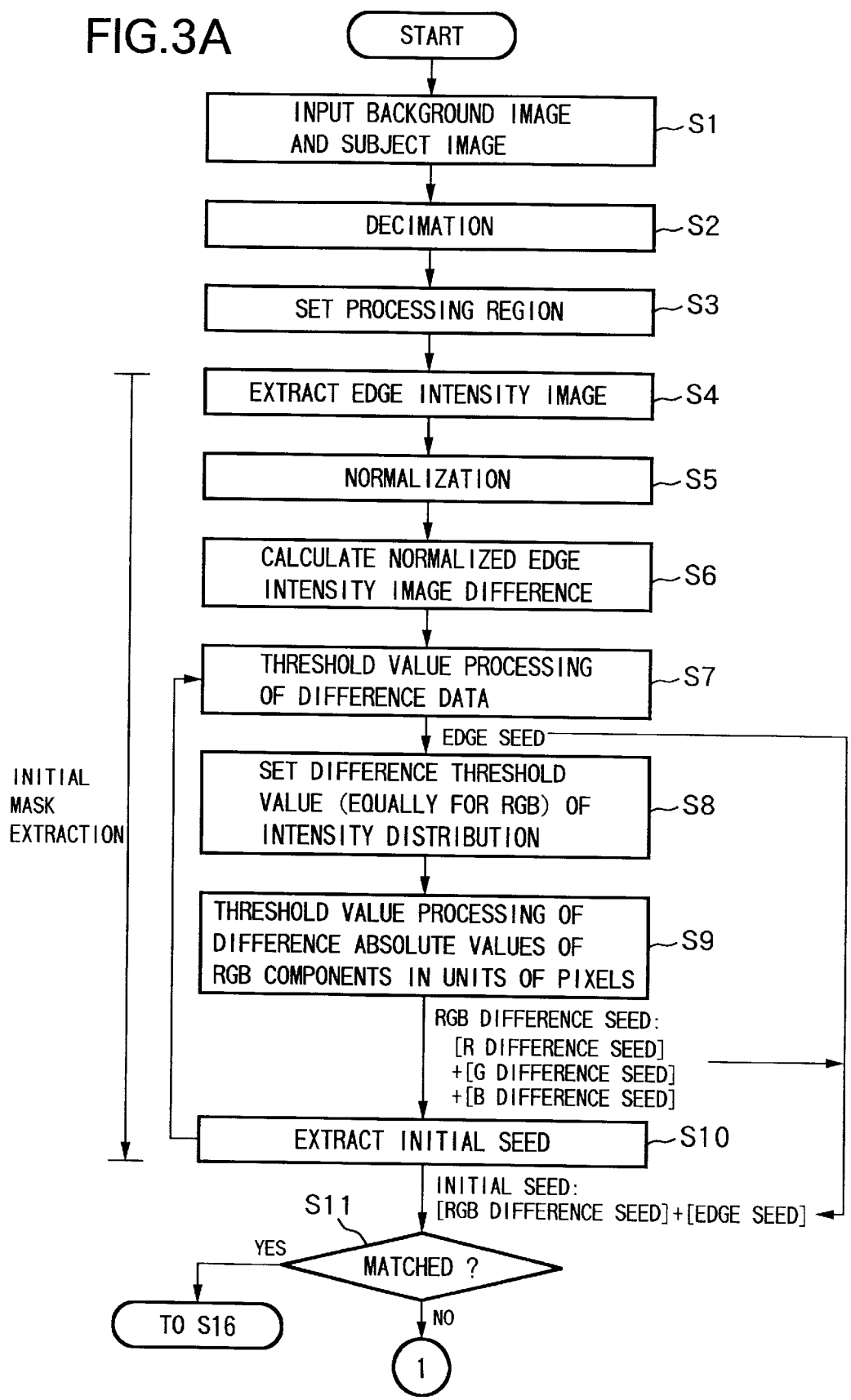
FIG. 3A is a flow chart showing subject extraction (mainly, initial mask region extraction) of the first embodiment.
Figure 3C:
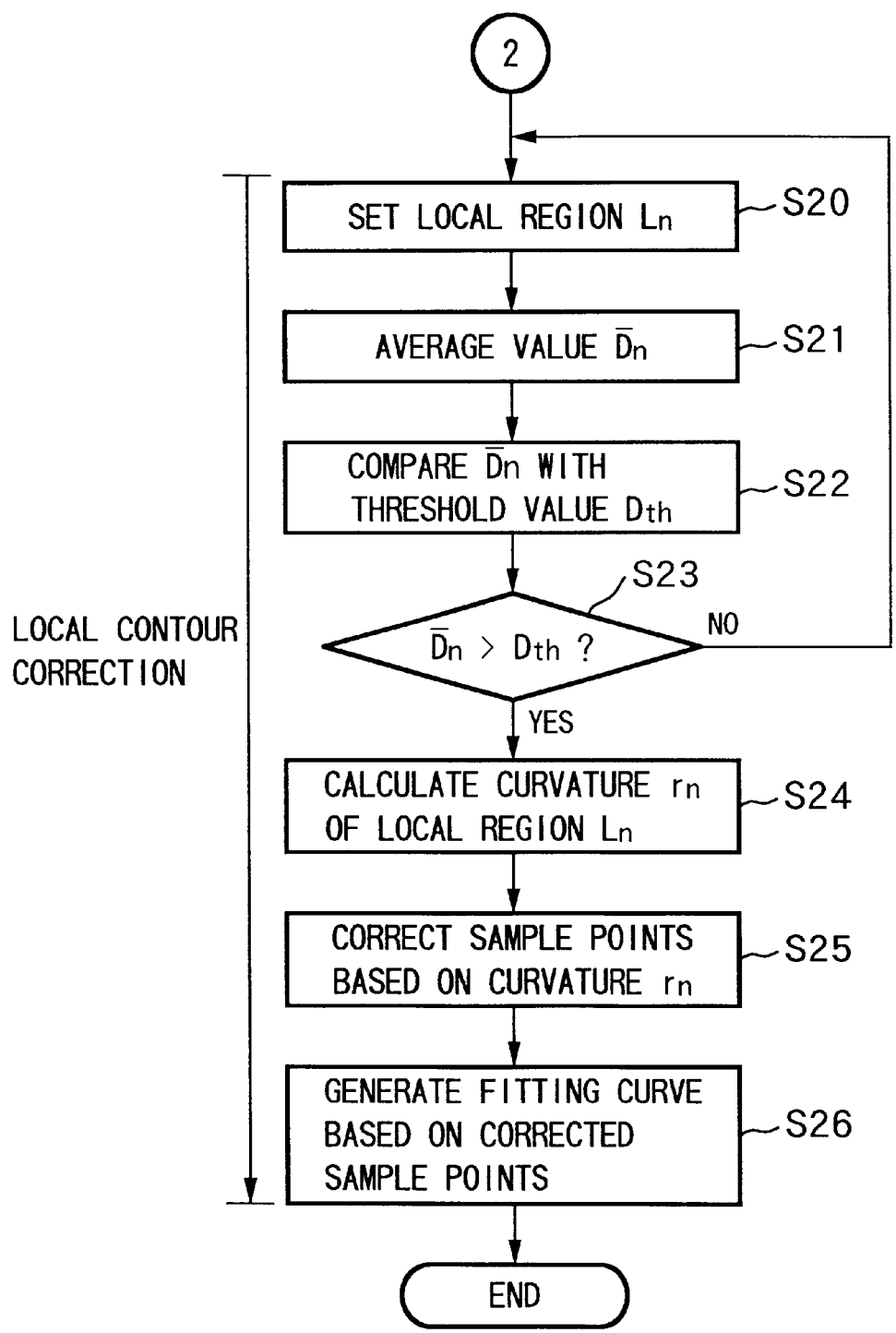
FIG. 3C is a flow chart showing subject extraction (mainly, local contour correction) of the first embodiment.

FIGS. 3A, 3B, and 3C show the processing flows of subject extraction executed by the extraction apparatus 20.

In step S1, a background image and a subject image (including a background) are individually input by the camera 10. The subject image is temporarily stored in the memory 22a, and the background image is temporarily stored in the memory 22b.

In step S2, each image data is decimated at a proper reduction ratio to increase the processing speed of the subsequent steps. In step S3, a processing target region to be subjected to extraction of the subject image is set on the subject image to include the existence range of the subject. Note that, for example, the user designates the target region using a mouse (not shown) attached to the console 38 while observing the subject image displayed on the monitor 40. The decimation in step S2 and setting of the processing region in step S3 may be omitted since they are done for the purpose of increasing the processing speed of the subsequent steps.

In steps S4 to S10, initial mask region extraction is done, and is substantially the same as "initial mask extraction" disclosed in U.S. patent application Ser. No. 08/886,076 above. That is, steps S4 to S10 are executed by the normalized edge intensity image extractor 24 and initial mask extractor 26 to extract an initial seed and to determine an initial mask region based on the initial seed. More specifically, the extractor 24 extracts edge intensity images from the subject and background images in step S4, and normalizes these edge intensity images in step S5.

The initial mask extractor 26 calculates the difference between the normalized background and subject edge images in step S6, and extracts an edge seed by executing threshold value processing for the difference data in step S7.

In steps S8 and S9, a color difference seed is extracted. The color difference seed is extracted by threshold value processing on the basis of differences of color components (R, G, and B values or hue values) in units of pixels in the background and subject images input in step S1. In step S10, an initial seed is extracted from the color difference seed extracted in step S9 and the edge seed extracted in step S7.

Note that the initial mask region extraction is not limited to the above-mentioned processing flow (S4 to S10). For example, the initial mask region may be extracted by executing threshold value processing of statistical quantities such as correlation coefficients among blocks having a predetermined size, each of which is defined to have a certain point as the center, the average values or standard deviations of pixel values, and the like.

The contents in steps S4 to S10 will be individually described below.

Extraction of the edge intensity images in step S4 uses a Canny edge detection operator (IEEE, Trans. Pattern Analysis and Machine Intelligence. Vol. PAMI-8, pp. 679–698, 1986), a Marr-Hildreth edge detection operator (Proc. Royal Society of London, Vol. B-207, pp. 187–217, 1980), and the like in addition to a Sobel operator, Prewitt operator, Roberts operator, and the like (Mori & Itakura, Basic of Image Recognition (II), Chapter 15, Ohm-sha, 1990).

Normalization in step S5 normalizes the subject and background edge images using the maximum intensity value of the subject edge image as a common factor for normalization. However, another normalization technique is used for a subject image including many edges serving as boundaries between the subject and background, i.e., for an image of a subject in which contours are densely distributed (e.g., a flower has many relatively fine partial shapes, and its image has many edges; an image having many edges will be referred to as an "edge-rich" image hereinafter). That is, blocks having a predetermined size are set to have the individual pixels of the subject edge intensity image as their centers, and the edge intensity value of a pixel having a maximum value in a block including a given pixel is replaced by the intensity value of the given pixel. Normalization is done by performing this manipulation for all the pixels of the edge intensity image.

As another normalization technique, it is effective for minimizing the influences of variations of image sensing conditions to adopt the maximum intensity values in the entire images (or local images) of the subject and background edge intensity images as normalization denominators for the corresponding images.

In the difference edge seed extraction steps (S6, S7), the difference absolute values between the normalized subject and background edge intensity images are calculated (S6), and points at each of which the difference absolute value becomes equal to or larger than a predetermined threshold value are left as an edge seed (S7). The threshold value may be appropriately changed in correspondence with each image.

Steps S8 and S9 make up the procedure for extracting a color difference seed. The color difference seed is formed by pixels at each of which the difference between color image data of the background and subject images is larger than a predetermined threshold value (determined in step S8). In step S8, an identical threshold value is set for R, G, and B color pixel values. In step S9, three color difference seeds (R, G, and B difference seeds) are obtained by threshold value processing in correspondence with R, G, and B colors, and a sum of these three difference seeds is called an "RGB difference seed". By setting a relatively high threshold value, the influences of variations of pixel values caused by noise and different image sensing conditions can be removed, and a light shadow or the like can also be removed.

In this manner, the edge seed and RGB difference seed are respectively obtained in steps S7 and S9.

In the initial seed extraction step (S10), an initial seed is obtained by combining the color difference seed and edge seed obtained in steps S9 and S7.

As described above, steps S1 to S10 correspond to the initial seed, i.e., initial mask extraction.

The initial mask region is displayed on the monitor 40. When the operator determines that the displayed initial mask roughly matches the subject region, the mask extraction ends, and the control enters contour shaping (S17). However, when the operator determines that the initial mask region is incomplete, the region growth steps (S12 to S16) shown in FIG. 3B are executed. The region growth is executed by the region growing module 28.

The processing in steps S12 to S16 of the region growing module 28 is substantially the same as "contour shaping" in the above-mentioned U.S. patent application. That is, in the region growth (S12 to S16), the similarity between image features of a pixel at a given point and each of its neighboring pixels (or region) at points on the boundary of each seed region of the initial mask, and if the similarity is higher than a predetermined threshold value, that point is determined to be that in an identical subject region, and is incorporated in the mask region.

As the parameters for similarity determination, brightness level and hue threshold values $I_{th}$ and $H_{th}$ are input (S12). In this embodiment, the difference absolute values (their reciprocals) of R, G, and B component values and hue value are used as the features, and the similarity is determined for each of eight neighboring pixels (S13). Especially, in this embodiment, when all the R, G, and B difference absolute values from the neighboring pixels become equal to or smaller than the threshold value $I_{th}$ or the hue difference absolute value becomes equal to or smaller than the threshold value $H_{th}$, it is determined that these pixels are similar to the pixel of interest (S13), and are incorporated in the subject region (S14).

On the other hand, when the distribution density of edge seeds in a predetermined region in the growth direction is smaller than a predetermined threshold value, the growth condition may be defined to stop growth in that direction (S15). For example, in a non-growth region present in a growth direction (one of eight neighboring directions), a processing region is set to include about 10 pixels from the most neighboring pixel. If the number of edge difference seeds in that region is zero or is 1 or 2 or less, and the similarity between the most neighboring pixel and the pixel of interest satisfies the growth condition, it is determined the region growth extends up to the most neighboring pixel, and the subsequent growth is stopped. Such restraint condition may be automatically applied when the image to be processed is an edge-rich image, or may be applied if the user so wishes.

After region growth (S15), hole filling that automatically fills holes of the subject region present in the non-growth portion is executed (S16). The maximum size of such holes is set as a default or is appropriately set by the user in consideration of the region growth result.

In step S17 after region growth (S12 to S16) is complete, the operator must determine if the obtained contour shape of the subject is incomplete, i.e., if contour shaping is necessary. If the operator determines that contour shaping is necessary, contour shaping (S18) and contour correction (S20 to S26) are executed. Contour shaping and contour correction are respectively executed by the contour shaper 30 and local contour corrector 32.

In contour shaping (S18), the surrounding portion of the contour is subjected to fitting using a smooth curve on the basis of the information of the contour generated by region growth (S12 to S16). For example, a large number of sample points are set on the contour, and a fitting curve such as a Bezier curve, Spline curve, or the like is generated on the basis of these sample points, thus approximating the contour using a smooth curve.

In step S18, the sample points are automatically set. Setting of sample points will be described below with reference to FIGS. 4 to 5B.

Figure 4:
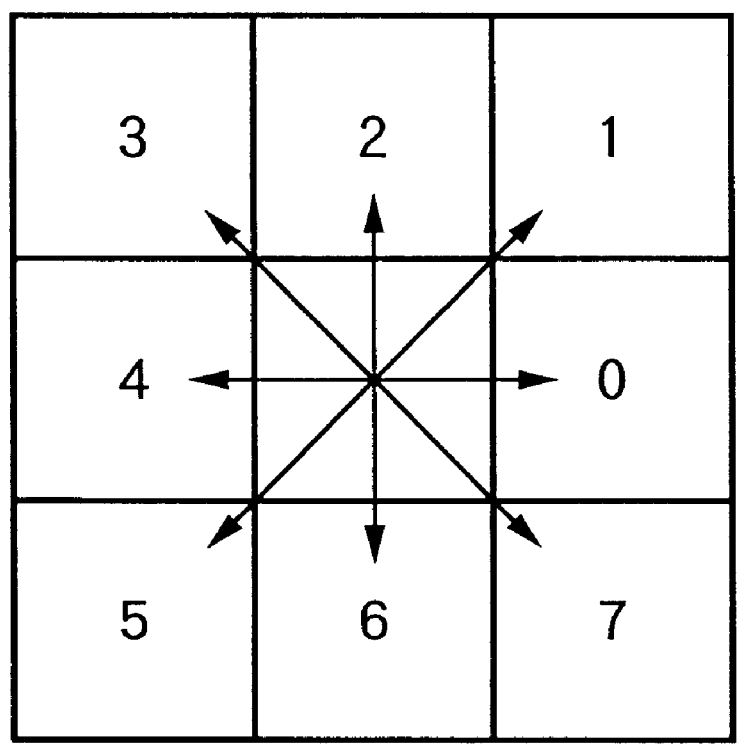
FIG. 4 is an explanatory view of a chain code used in the first embodiment.
Figure 5A:
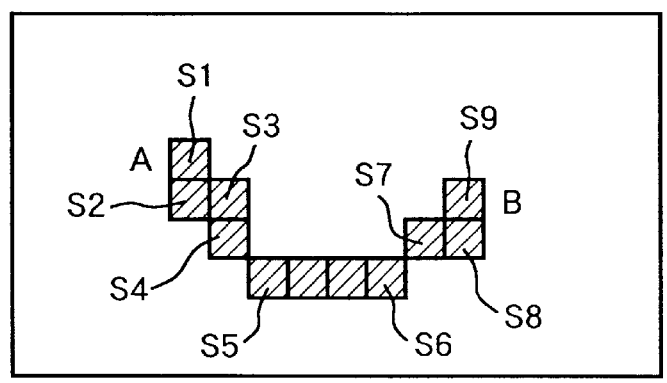
FIG. 5A shows an example of a line to which the chain code is applied.
Figure 5B:
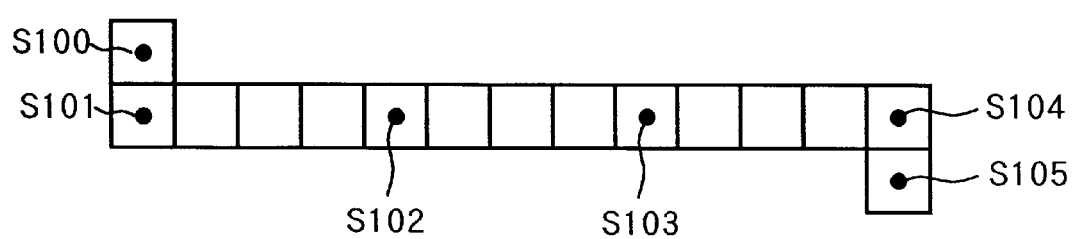
FIG. 5B is a view for explaining another generation method of the chain code.

In step S18, the contour obtained by region growth (S11 to S15) is coded using a "chain code". The chain code is one method of coding a line figure. As shown in FIG. 4, one code (ranging from values "0" to "7") is set at each of eight directions for the point of interest at the center of, e.g., a 3×3 block, and a line figure is coded by the chain of such codes. For example, a contour extending from point A to point B shown in FIG. 5A is coded to be:

6067000102

For this purpose, sample points for generating a fitting curve are set at change points of the chain codes. In the example shown in FIG. 5A, nine points $SP_1$ to $SP_9$ are "sample points" for generating a fitting curve. In some contours, a long straight line may appear. In such case, when identical codes successively appear in the sequence of chain codes of a contour, sample points are set at a predetermined interval. In an example shown in FIG. 5A, sample points SP101 and SP104 fire change points of chain codes, and two sample points SP102 and SP103 are set between these points.

Figure 6:
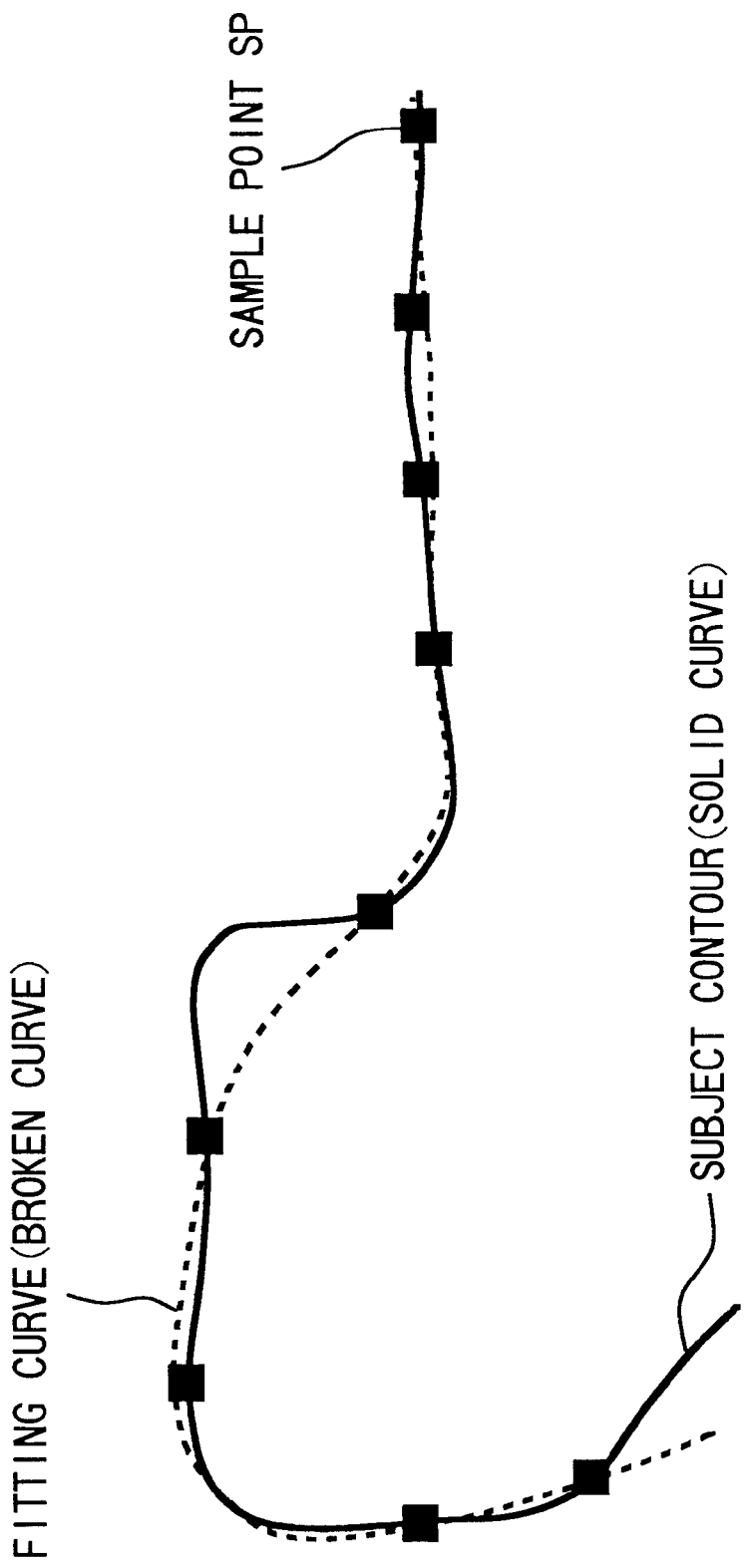
FIG. 6 shows an example of a contour shaped by the first embodiment.

Along these sample points set in this manner, for example, a Bezier curve, Spline curve, or the like is fitted in step S18. FIG. 6 shows the contour (solid curve) generated for a certain subject, and the fitting curve (broken curve) generated in step S18. In FIG. 6, sample points are indicated by symbols ■.

In addition to the above-mentioned sample point setting method, a method of setting sample points in accordance with the curvature value on the basis of the curvatures of a contour or the like is available, and such method can be used.

The contour generated in step S18 is shaped but is one obtained by approximation using a Bezier curve or the like. For this reason, as shown in FIG. 6, the generated contour has portions considerably different from the subject contour indicated by the solid curve. In the subsequent steps S20 to S26, such different portions are corrected. The contour generated in steps S12 to S16 is locally corrected by the local contour corrector 32 on the basis of the fitting curve generated in step S18. The processing in steps S20 to S26 in FIG. 3C is executed by the local contour corrector 32.

More specifically, in step S20, local regions $L_n$ for contour correction are set. The local regions $L_n$ are set by the operator at desired positions on the subject contour using, e.g., a mouse or are set by the corrector 32 at positions at a predetermined interval on the subject contour, and each local region has a length l along the contour, as shown in FIG. 7.

Figure 7:
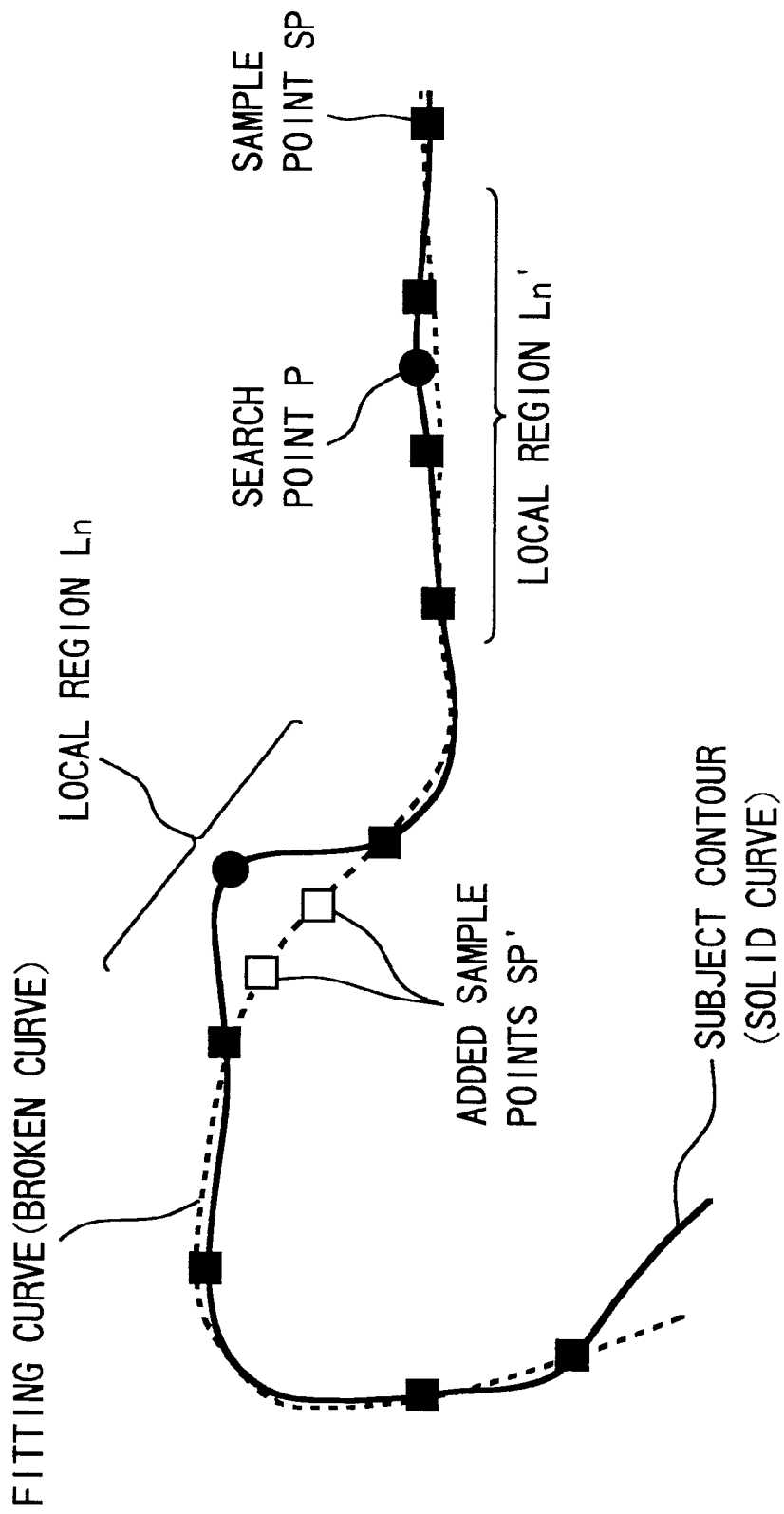
FIG. 7 is a view showing contour correction of the first embodiment.

In the example shown in FIG. 7, two local regions $L_n$ and $L_n'$ are set.

In steps S2L to S23 in FIG. 3C, it is determined if the local regions $L_n$ set in step S20 require correction. This determination is made by evaluating the degree of matching between the fitting curve (the broken curve in FIG. 6) generated in step S18 and the subject contour (the solid curve in FIG. 6) obtained by region growth in steps S12 to S16. In the example shown in FIG. 7, of the two local regions $L_n$ and $L_n'$, the region $L_n'$ has a high degree of matching. For this reason, a fitting curve portion corresponding to $L_n'$ is adopted as the corrected contour portion. On the other hand, since the region $L_n$ has a low degree of matching, it must be corrected, and the corrected fitting curve is adopted as the corresponding contour portion.

Figure 8:
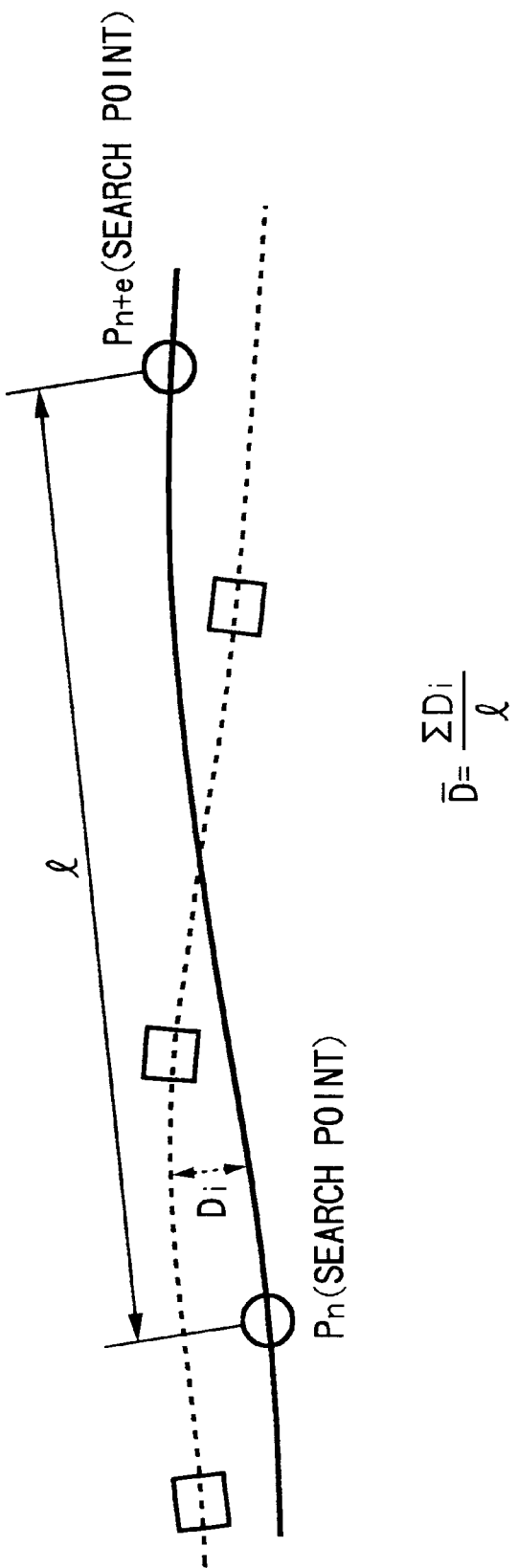
FIG. 8 is a view for explaining sample point generation in the contour correction of the first embodiment.

FIG. 8 explains the technique for evaluating the degree of matching.

More specifically, between search points $P_n$ and $P_{n+1}$ in the local region $L_n$, distances $D_i$ from the individual points on the contour to the closest points on the fitting curve are added in turn, and the sum is averaged to obtain a value $\overline{D}_n$ (S21). That is, as shown in FIG. 8, if the region $L_n$ includes l sample points, the average distance $\overline{D}_n$ is given by:

$$\overline{D}_n = \frac{\sum D_i}{l}$$

The obtained average distance $\overline{D}_n$ is compared with a threshold value $D_{th}$ (S22). If $\overline{D}_n$ is larger than $D_{th}$, i.e., if $$\overline{D}_n > D_{th}$$

it is determined that the local region $L_n$ is a unmatched region; otherwise, i.e., if $$\overline{D}_n \leq D_{th}$$

is determined that the region $L_n$ is a matched region, and the flow returns to step S20 to search for the next unmatched region.

If it is determined that the local region $L_n$ is an unmatched region, sample points SP are corrected as follows in steps S24 to S26.

More specifically, a curvature $r_n$ of the local region $L_n$ is calculated (S24), and sample points SP' are added onto the contour within the local region $L_n$ on the basis of the curvature $r_n$ (S25). If the curvature $r_n$ is small, as shown in FIG. 9A, i.e., if the contour is sharply unmatched from the fitting curve, sample points SP' are densely added (five sample points SP indicated by symbols □ shown in FIG. 9A); if the curvature $r_n$ is large, i.e., if the contour is only slightly unmatched from the fitting curve, sample points SP' are coarsely added (two sample points SP indicated by symbols □ shown in FIG. 9B), as shown in FIG. 9B. A fitting curve is re-generated on the basis of the corrected (added) sample points, and is displayed (S26). In this case, the fitting curve is approximated by a Bezier or Spline curve on the basis of the new sample points SP'.

The number of sample points SP' to be added is determined based on, e.g., the reciprocal of the curvature r of the region $L_n$. That is, let $r_{min}$ and $r_{max}$ be the maximum and minimum values that the curvature r is empirically known to assume. If the maximum value of the number of sample points to be added is set at k, the number of sample points to be added to the region with the curvature r is determined by:

$$k \cdot \frac{r}{r_{max}} \quad (\text{for } r > r_{min}).$$

If $r \leq r_{min}$, the number of sample points to be added is set at 1.

The above-mentioned processing (S20 to S26) is executed for the points on the contour to correct the fitting line, thereby forming a final subject contour.

Note that the above-mentioned processing (S20 to S26) may be executed for all the points on the contour but may be executed for points at a proper interval.

<Second Embodiment>

In the first embodiment shown in FIGS. 1 to 9, all the images stored in the memory 22 are processed. Alternatively, processing may focus on a region that includes a subject image alone (or a region that is likely to include a subject image alone). In the second embodiment, an image is segmented before contour extraction, and contour extraction is done for an image in each segmented partial region.

Figure 10:
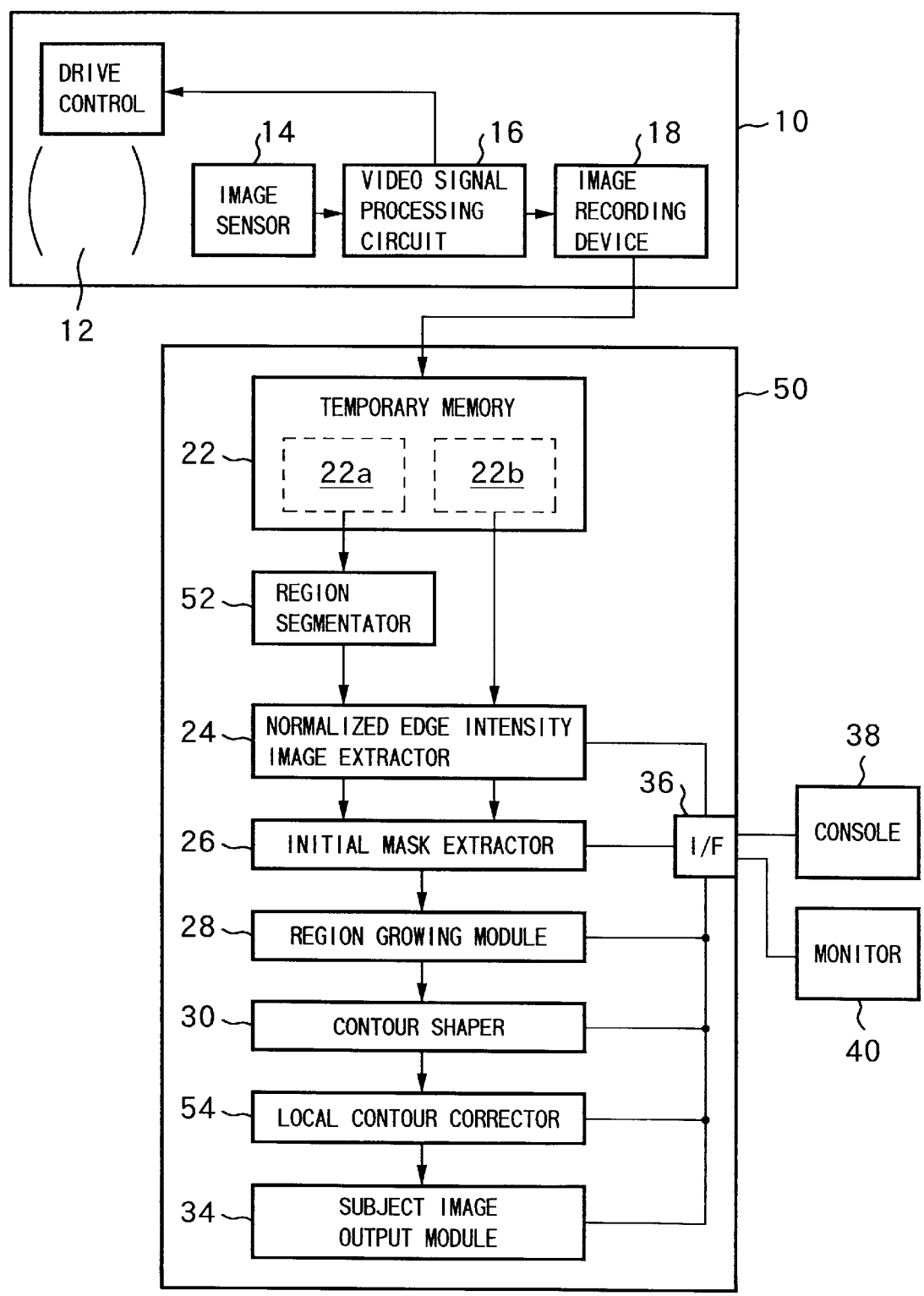
FIG. 10 is a schematic block diagram showing an arrangement according to the second embodiment.

For this purpose, an extraction apparatus 50 (FIG. 10) comprises a region segmentator 52 in addition to the arrangement (FIG. 1) of the first embodiment, and the contents of contour correction are different from those in the first embodiment.

Figure 11:
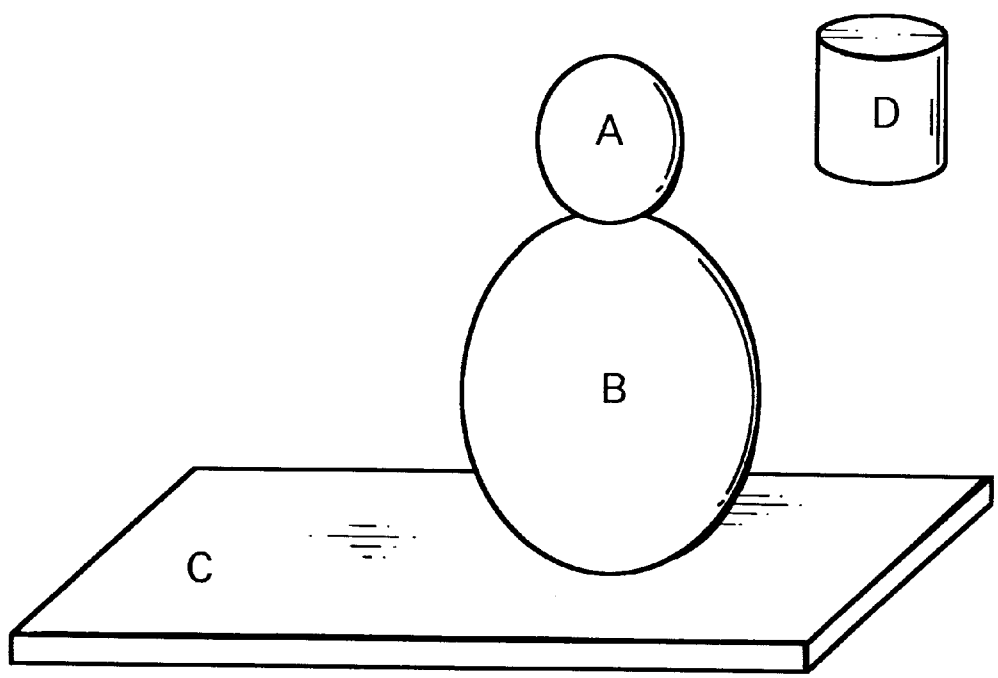
FIG. 11 shows an example of an input image used in the second embodiment.
Figure 12A:
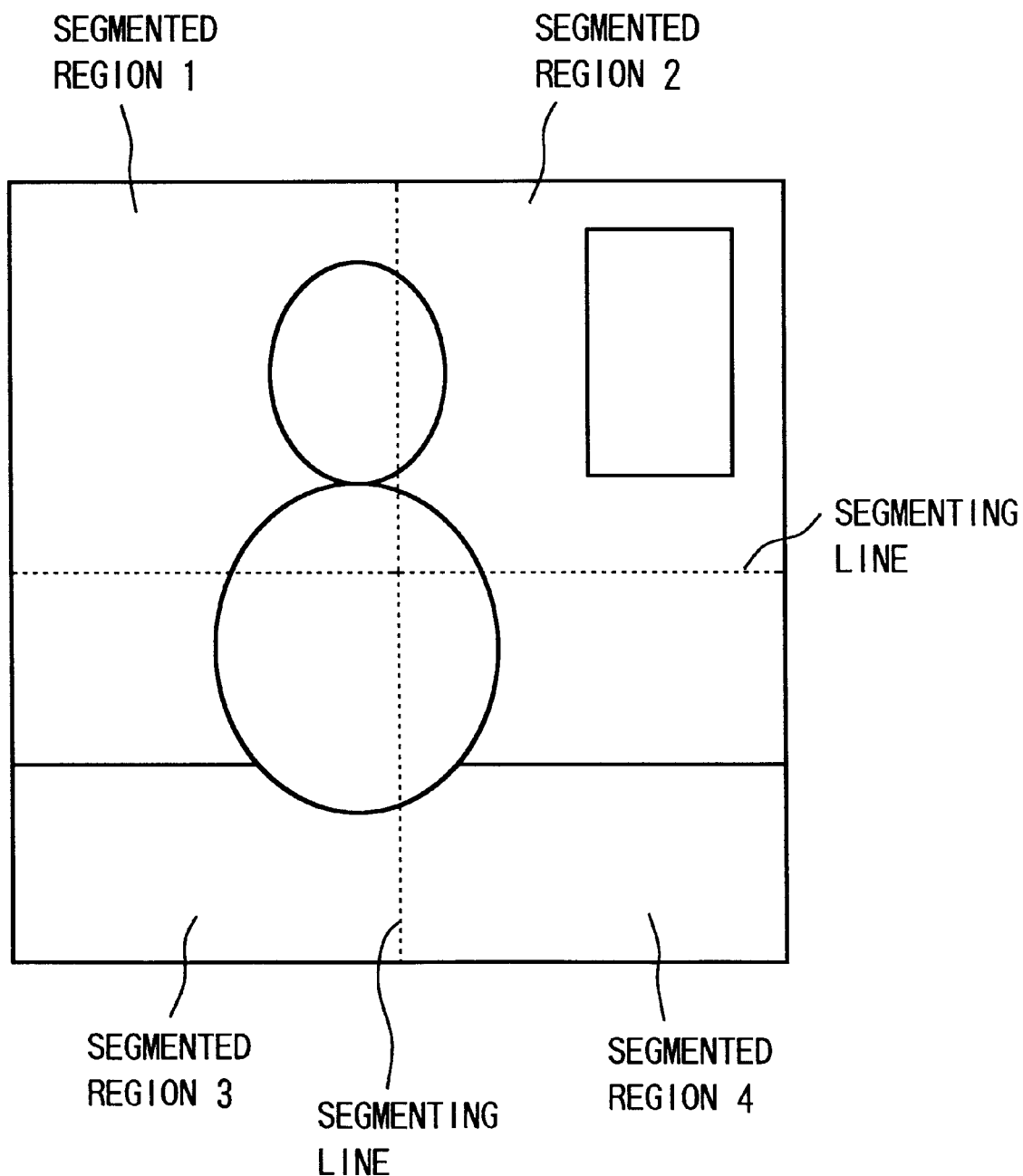
FIG. 12A is a view showing region segmentation of the second embodiment.

FIG. 11 shows a subject used for explaining the operation of the segmentator 52 of the second embodiment. This subject includes two egg-like articles A and B placed on a table C and a column D. The image of this subject is as shown in, e.g., FIG. 12A. In FIG. 12A, the broken lines are segmenting lines of the segmentator 52.

Figure 13:
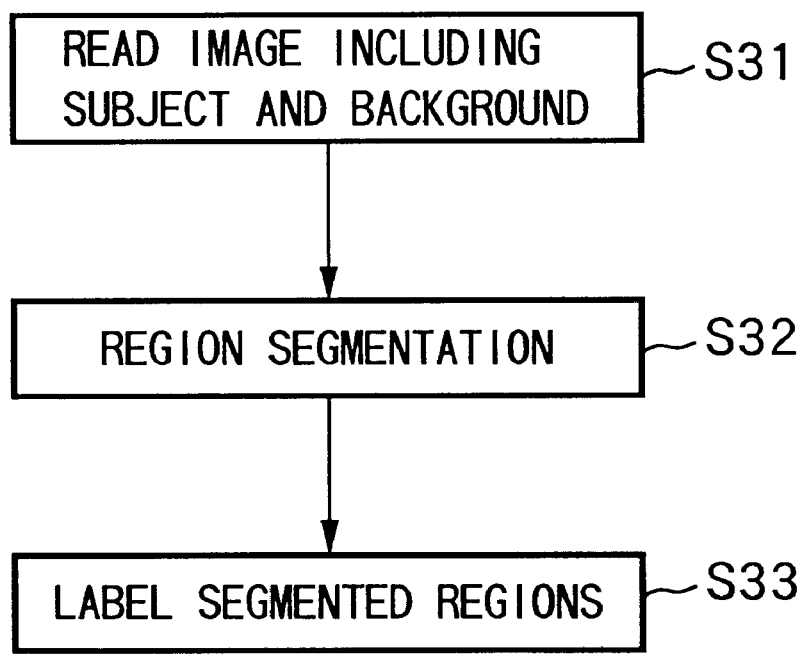
FIG. 13 is a flow chart of the region segmentation of the second embodiment.

FIG. 13 shows the control sequence of the region segmentator 52 of the second embodiment. The segmentator 52 reads an image including a subject and background (S31) and segments it into a plurality of regions (S32). As the region segmentation method, a method using clustering on an image or feature space, a method using edges in an image, texture analysis, and the like may be used. For example, please refer to Takeshi Agui & Shin Nagao, "Processing and Recognition of Image", Chapter 9, Shokodo.

Figure 12B:
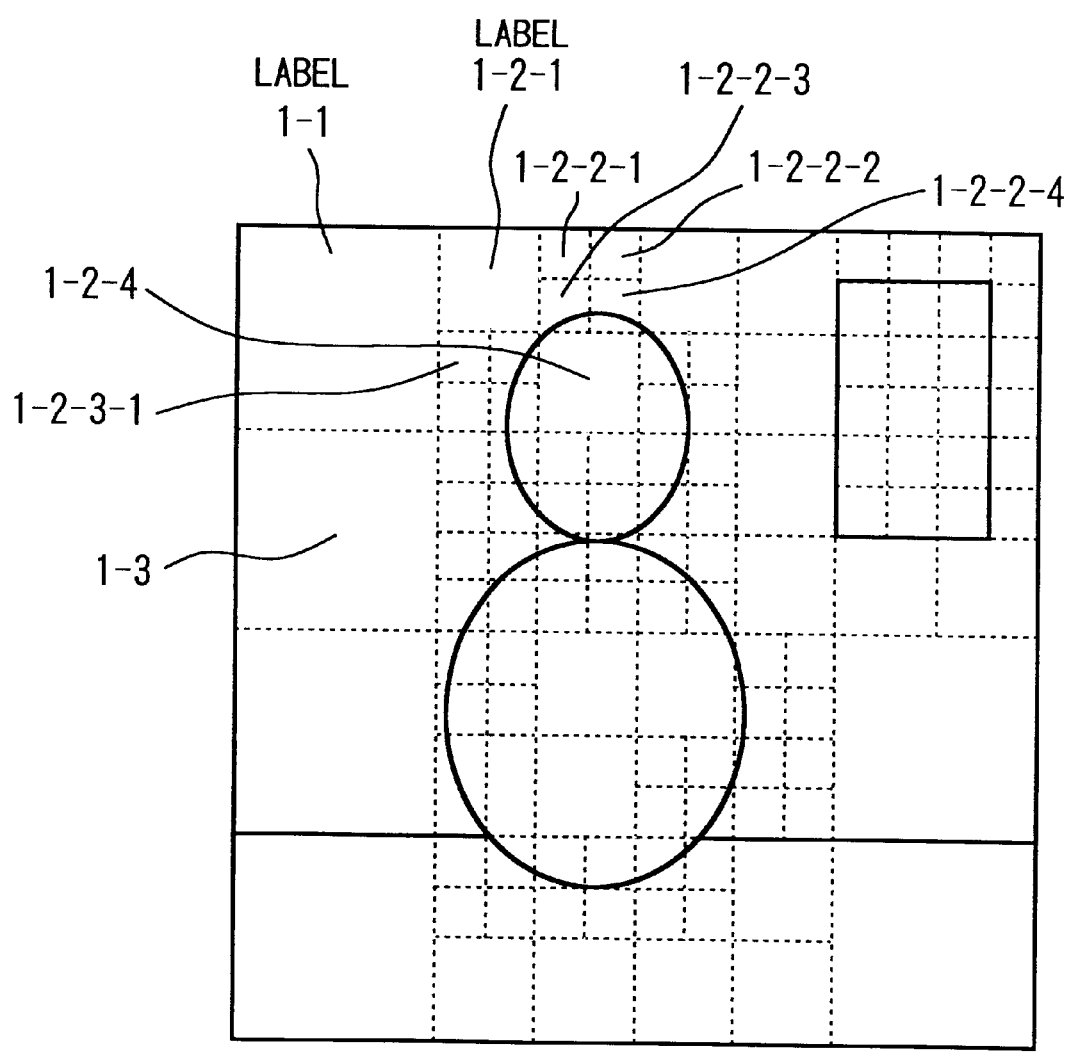
FIG. 12B is a view showing the result of region segmentation and labeling of the second embodiment.

A case will be briefly described below with reference to FIGS. 12A and 12B wherein a method using a quad tree as one method using clustering is applied to step S32.

As shown in FIG. 12A, the segmentator 52 segments an image including a subject and background into four square partial images depending on the presence/absence of given features. Also, the segmentator 52 segments each segmented partial image into four regions. Such segmentation is repeated until each segment has only one feature, i.e., a uniform region is obtained. FIG. 12B shows the region segmentation result of the second embodiment, and each region has only one feature.

Note that the differences of gradation values, RGB values, density gradients, and the like may be used as the features upon region segmentation.

After such region segmentation, labels for identifying the segmented regions are given, and the labeled information is stored in a memory (not shown) (S33).

Note that "labeling" of the second embodiment assigns attribute "1" to a segment inside the subject region, and assigns attribute "0" to a label in the background region. The assignments are made by the user seeing a monitor display.

Subject region extraction and contour shaping of the second embodiment are the same as those described in the first embodiment.

After the subject region is set by a series of extraction processes done by the normalized edge intensity image extractor 24, initial mask extractor 26, region growing module 28, and contour shaper 30 of the second embodiment, a fitting curve is generated on the basis of the contour of the subject as in the first embodiment. A local contour corrector 54 of the second embodiment executes contour correction for the contour.

Figure 14A:
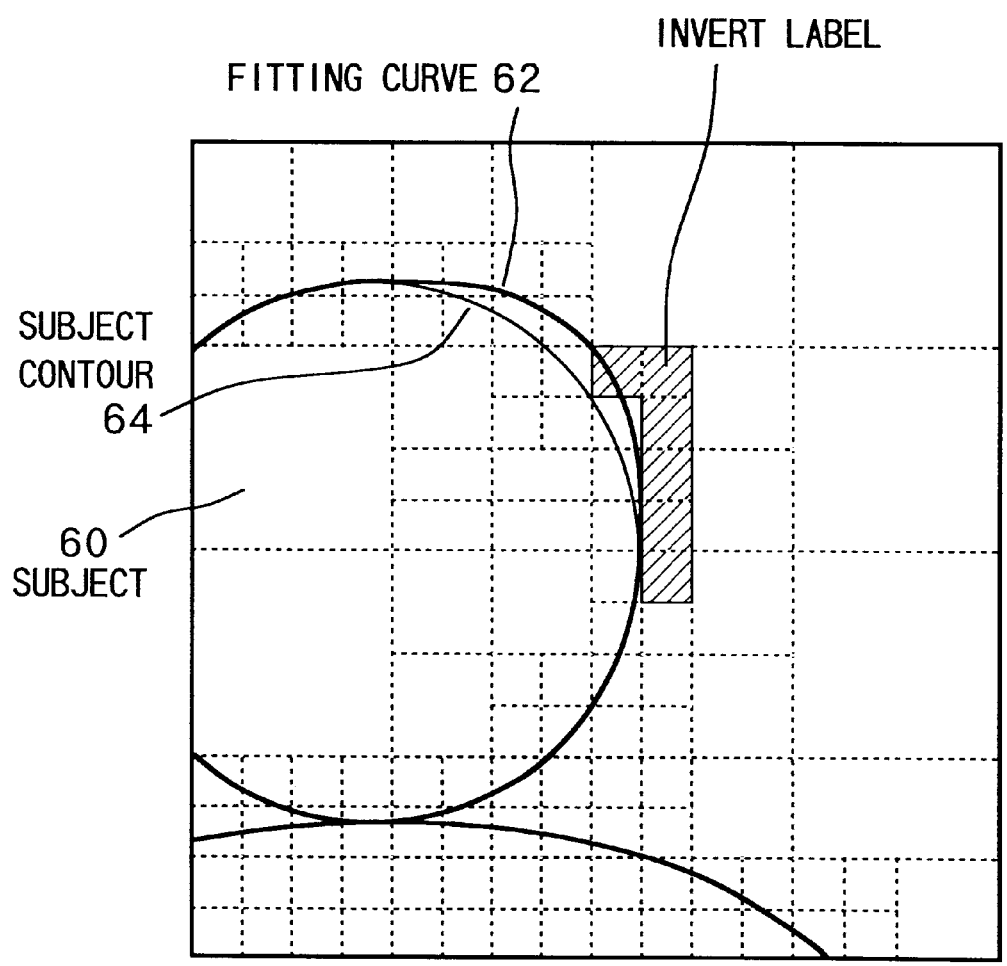
FIG. 14A is a view showing the state of a contour after region segmentation and before contour correction.
Figure 14B:
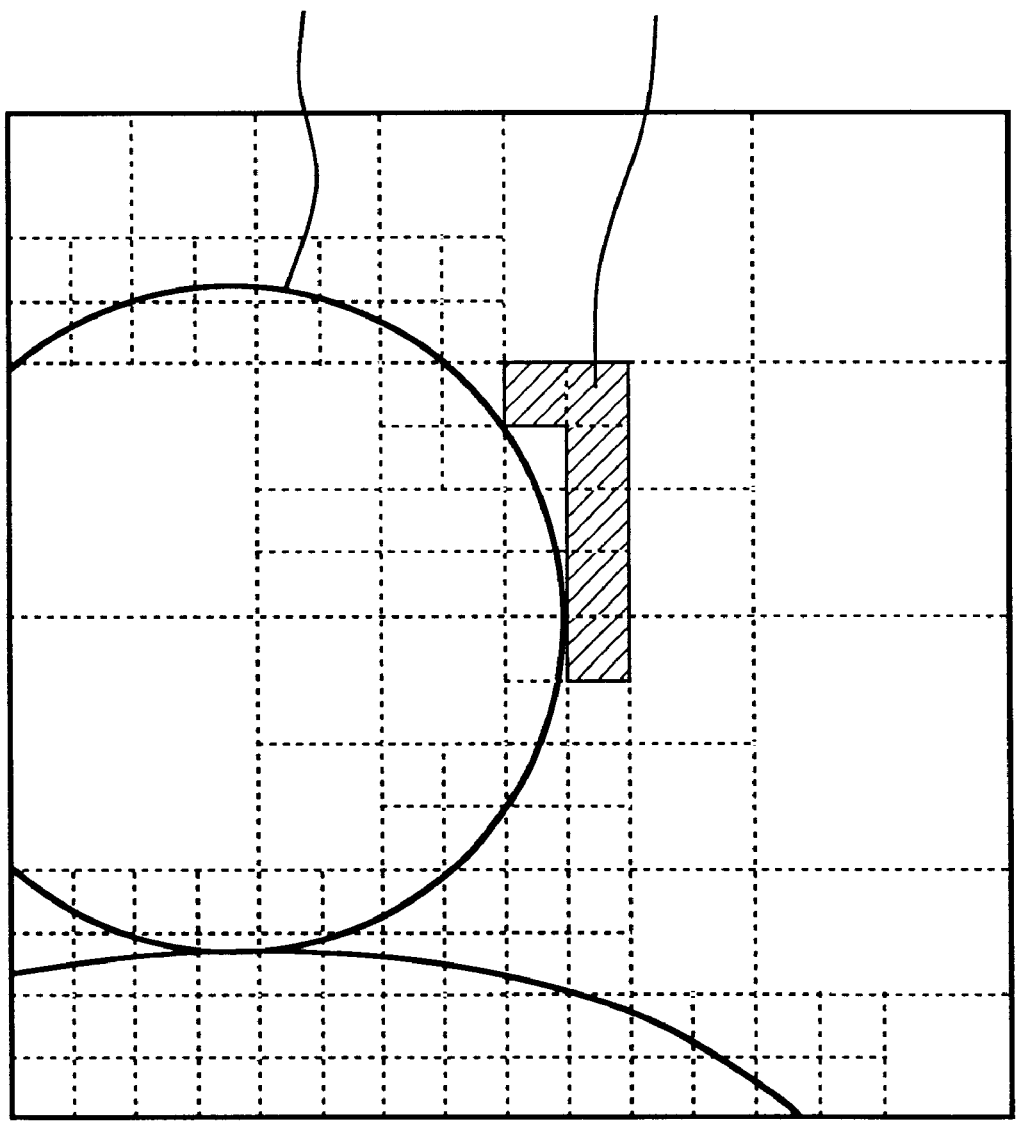
FIG. 14B is a view showing the state of the contour after region correction.
Figure 15:
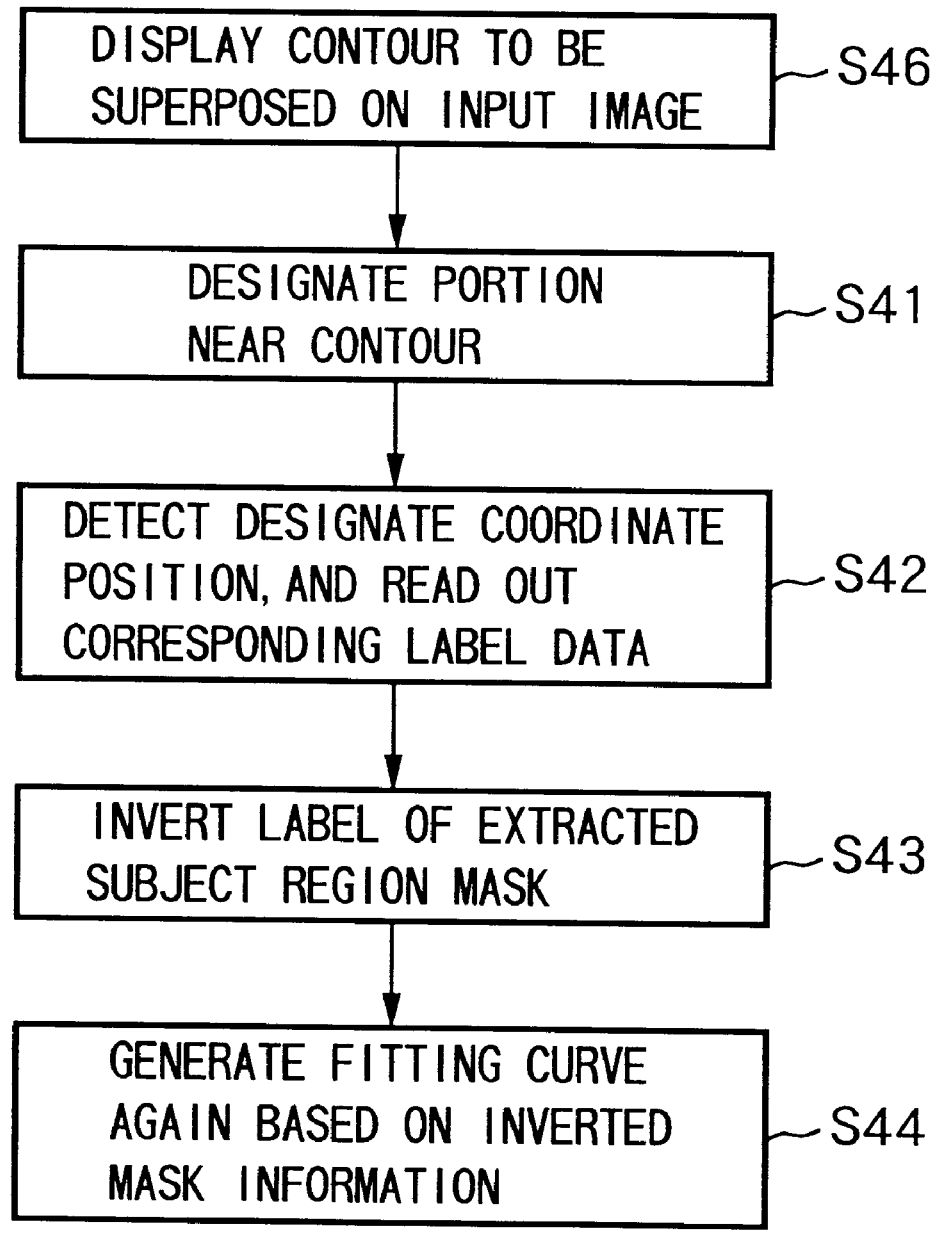
FIG. 15 is a flow chart showing contour correction of the second embodiment.

FIG. 14A shows the contour of subject A before correction of the second embodiment, and FIG. 14B shows the contour after correction. FIG. 15 shows the control sequence of the local contour corrector 54.

In the example shown in FIG. 14A, a bold curve (i.e., the fitting curve obtained by the processing in step S18) 62 around a subject 60 corresponds to the contour of the subject region obtained as a result of subject extraction and contour shaping. This contour 62 partially swells outwardly a subject contour 64 extracted from seeds. In the contour correction step of the second embodiment, the contour 62 obtained by shaping and the contour obtained by contour correction are emphasized and displayed on the screen of the monitor 40 to be superposed on the subject image. FIGS. 14A and 14B depict such display state for the purpose of description.

In contour correction of the local contour corrector 54, the user designates a portion in the vicinity of the contour portion to be corrected by dragging using a pointing device such as a mouse or the like (S41 in FIG. 15). In the example shown in FIG. 14A, a hatched region is designated. The coordinate positions of the dragging path are detected, and data of labels including these coordinates are read out from the above-mentioned memory (not shown) (S42).

Subsequently, the attributes of the labels read out in step S42 are inverted (S43). That is, if a region corresponding to one readout label falls within the extracted subject region mask, the label attribute of that region is changed to indicate a background region (attribute "0"); if the region falls outside the subject region mask, the label attribute of that region is changed to indicate a subject region (attribute "1").

Sample points are automatically corrected on the basis of the inverted mask label information, and a fitting curve is generated again, thereby smoothly coupling the contour (S44). With this processing, the fitting curve shown in FIG. 14A is corrected, as shown in FIG. 14B.

Upon generating a fitting curve, if a portion of the curve passes a label region with the background attribute, the fitting curve may be preferentially generated, or may be generated while inhibiting the curve from passing the label region with the background attribute.

In the second embodiment, label attribute inversion processing is described as default processing. Alternatively, the feature in each designated label region may be compared with those of surrounding labels, and the attribute of that region may be set to indicate the subject or background region.

<Third Embodiment>

In the first and second embodiments, subject and background images are independently input. However, the third embodiment extracts a subject region from a single image to execute contour shaping and contour correction.

Figure 16:
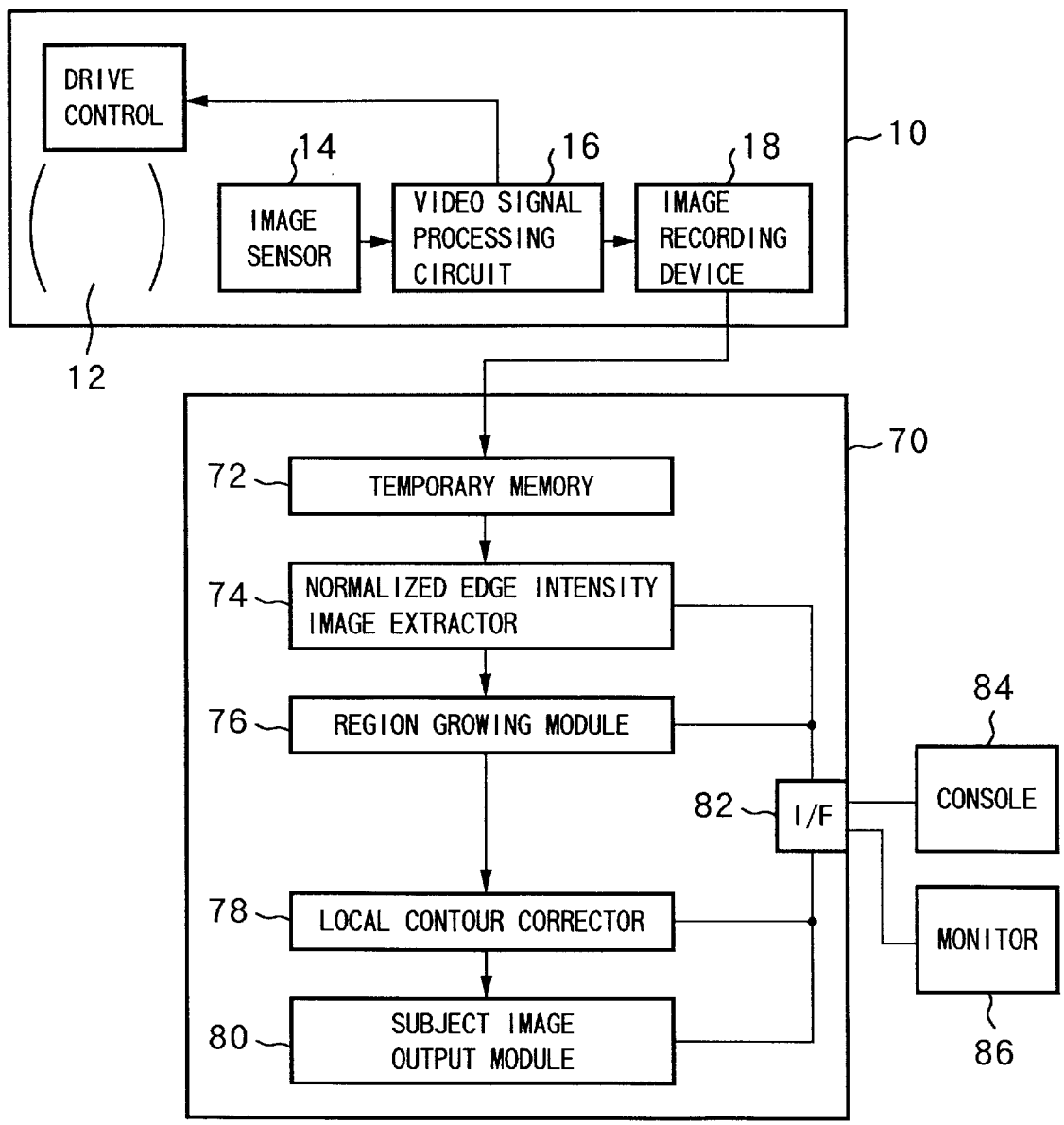
FIG. 16 is a schematic block diagram showing an arrangement according to the third embodiment.

FIG. 16 is a schematic block diagram showing the arrangement of the third embodiment. Note that a camera 10 has the same arrangement as that in the first or second embodiment and, hence, an extraction processor 70 is different from that in the first or second embodiment.

The subject extraction processor 70 comprises a temporary memory 72, a normalized edge intensity image extractor 74, a region growing module 76, a local contour correction processor 78, a subject image output module 80, and an interface 82, to which a manipulation device such as a mouse or the like and a monitor 86 for displaying an image are connected. Some components of the subject extraction processor 70 are implemented by program software but may be realized by a gate array.

Figure 17:
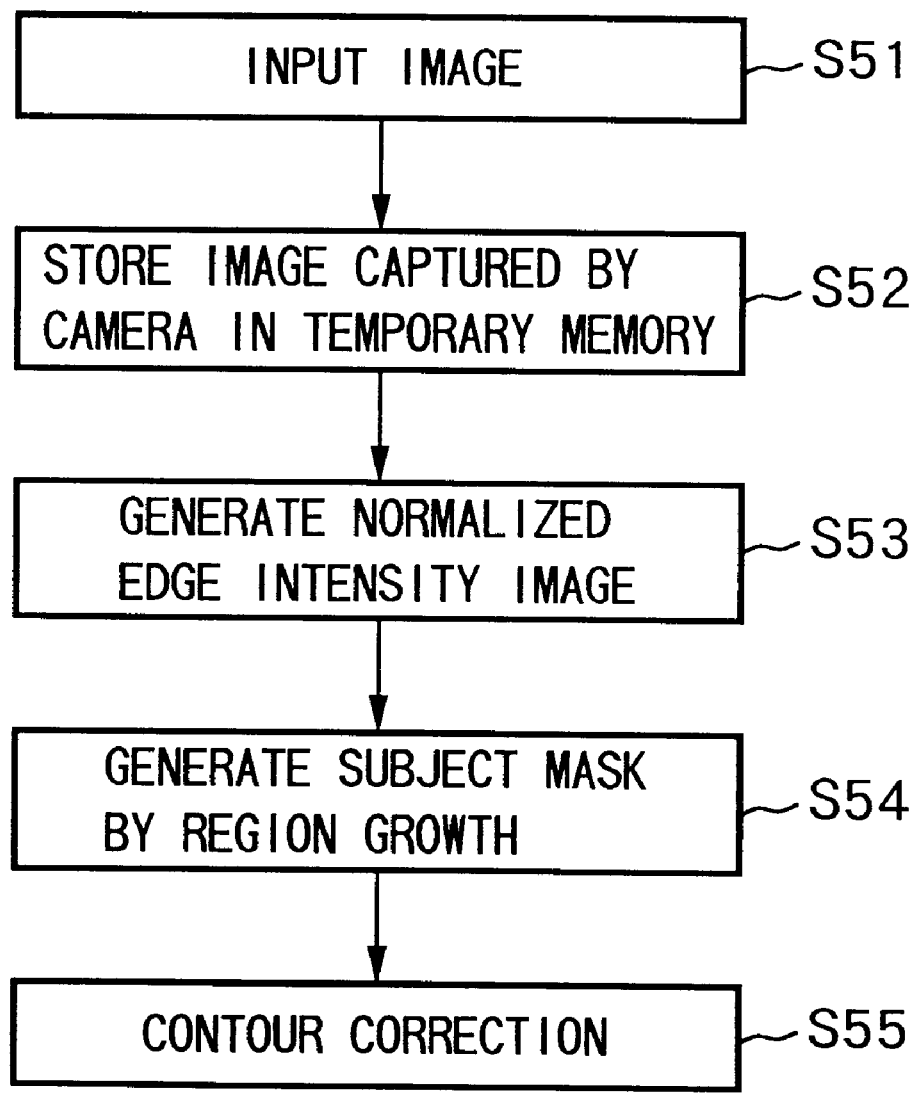
FIG. 17 is a flow chart showing subject extraction of the third embodiment.

FIG. 17 is a flow chart showing the operation of the subject extraction processor 70 according to the third embodiment.

The camera 10 senses an image including a subject and background (S51), and stores the sensed image in the memory 72 in the subject extraction processor 70 (S52) after internal signal processing. The normalized edge intensity image extractor 74 extracts normalized edge intensity image by the same processing as in the first embodiment (S53).

The region growing module 76 grows a mask of the subject region (S54). As the region growth processing method, a method described in Takeshi Agui & Shin Nagao, "processing an Recognition or Image", Chapter 9, Sokodo can be used.

Region growth in the third embodiment will be briefly explained below.

Figure 18:
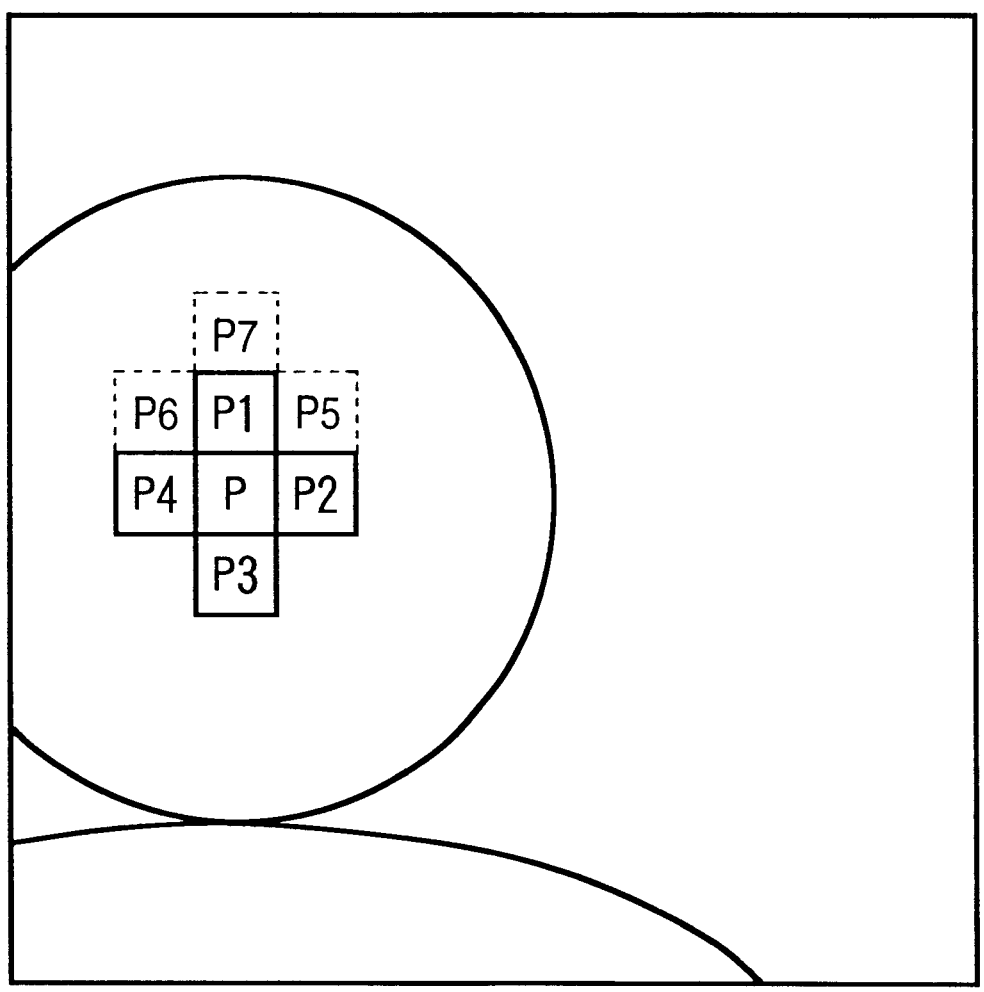
FIG. 18 is an explanatory view of region growth of the third embodiment (before region growth)

When the user designates a certain point P in the subject region displayed on the screen of the monitor 86, the region growing module 76 designates four neighboring pixels $P_k$ to have the designated point (pixel) P as the center, as shown in FIG. 18, and compares the similarities between the four neighboring pixels $P_k$ and pixel P. For example, the similarity to be used is given by:

$$\frac{\sum_{i=1}^{4} |P - P_i|}{4}.$$

When this similarity is smaller than a predetermined threshold value, it is determined that the pixels $P_1$, $P_2$, $P_3$, $P_4$ as well as the pixel P designated by the user are within the subject region. Since the pixel P that is initially designated by the user is one that the user knows within the region, it is more likely that the five pixels are within the subject region.

The region growing module 76, then, designates four pixels $P_{kq}$ (q=1–4) surrounding each pixel of the above four pixels $P_k$ (k=1–4). Two pixels of the four pixels $P_{kq}$ are selected two ones from among the five pixels P, $P_1$, $P_2$, $P_3$, $P_4$. In the FIG. 18 example, two pixels $P_1$ and P are elected from the previous pixels, and three pixels $P_5$, $P_6$, $P_7$ are newly designated. Then, calculated is a similarity for the five pixels (P, $P_1$, $P_5$, $P_6$, $P_7$) according to the above equation. The calculated similarity exhibits whether or not the three pixels $P_5$, $P_6$, $P_7$ are within the subject region. In a case the similarity shows the pixels are within the region, they are regarded as constituting the mask, thus the subject region being grown. Contrarily, the similarity shows the pixels are without the region, they are regarded as background. The above processes are repeated for every and all the pixels starting the pixel P.

An advantage of the third embodiment is that users are permitted simply to designate a pixel which the user believes is within a subject region so that the subject region may be grown.

Figure 19:
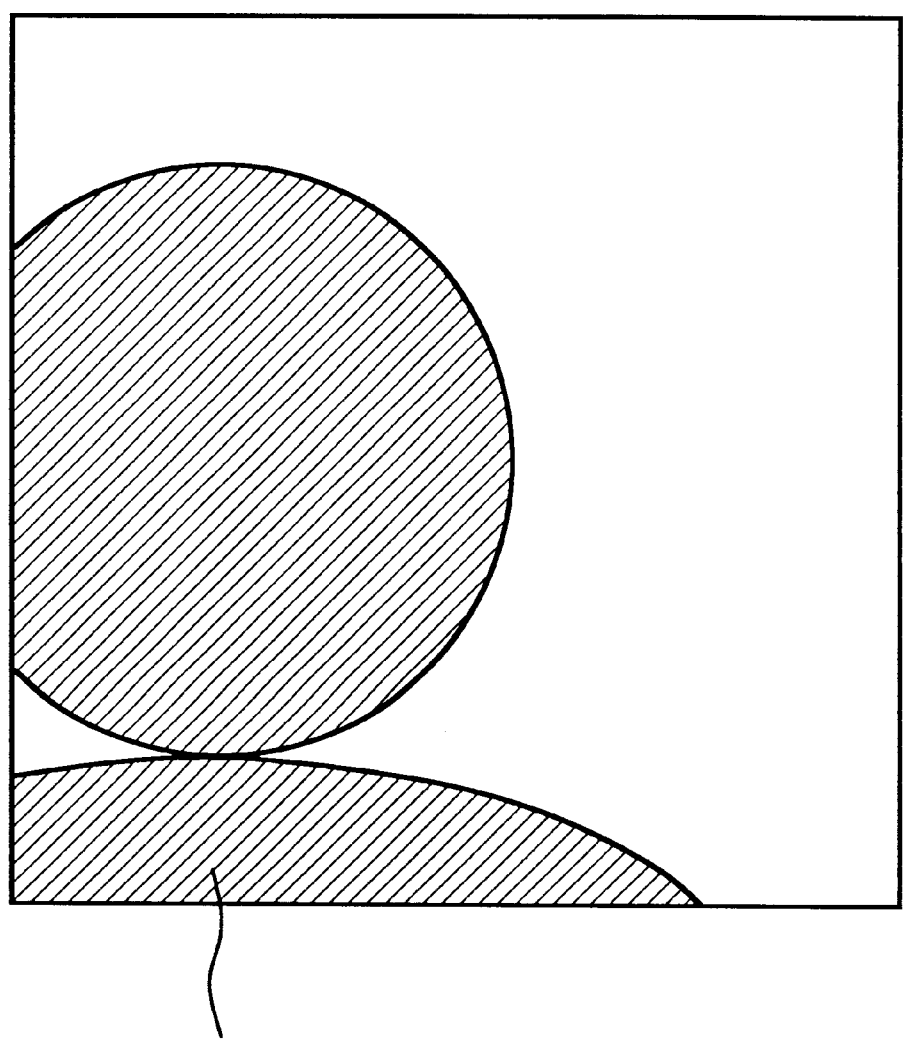
FIG. 19 is an explanatory view of region growth of the third embodiment (after region growth)

FIG. 19 shows the subject contour obtained by region growth (step S54).

As a similarity between pixels, the differences of RGB values, density gradients, and the like may be used in addition to the differences of gradation values, but other information may be used. When the RGB value differences and the normalized edge intensity information obtained by the extractor 74 are used, the accuracy can be further improved. More specifically, region growth in step S54 is done using determination formula D below as a measure of the similarity. Determination formula D is given by:

$$D = (RGB \text{ difference}) - \Delta_{th} - a \times (\text{normalized edge intensity}) + b$$

where $\Delta_{th}$ is a threshold value for the RGB difference, and a and b are constants.

If this similarity D is positive (>0), the pixel P is not to be incorporated in a contour. Determination formula D including "normalized edge intensity" serves to suppress region growth at the edge position.

In this way, according to the third embodiment, even when the subject and background regions have the same RGB values, the subject region alone can be extracted using edge information.

Subsequently, contour correction (S55) is executed using the region obtained by region growth in step S54 as a subject mask.

Note that the subject region mask can also be generated by the user by roughly drawing a contour along the shape of the subject using a mouse or the like.

Image extraction of the third embodiment is characterized in that the need for inputting a background image is obviated and contour correction is interactively done by the operator. That is, a graphic user interface for contour correction is provided.

The contents of the graphic user interface of the local contour corrector 78 will be described below.

Figure 20:
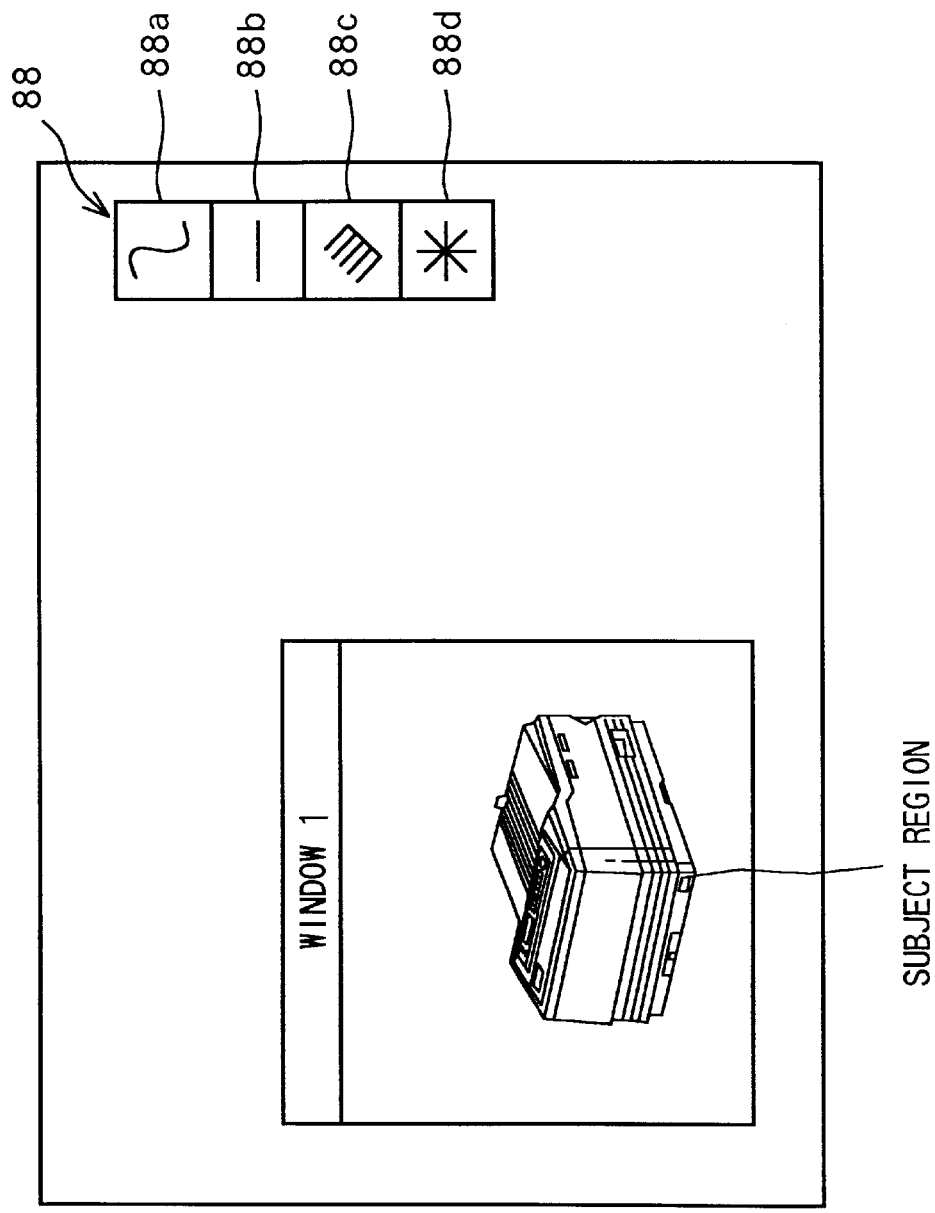
FIG. 20 shows an example of a window for contour correction of the third embodiment.

FIG. 20 shows the graphic user interface for contour correction implemented by the third embodiment. That is, in FIG. 20, an image of a subject (laser beam printer) obtained by the processing until step S54 is displayed on window 1.

Reference numeral 88 in FIG. 20 denotes tools for contour correction. Reference numeral 88*a* denotes a tool for smoothing a contour; 88*b*, a tool for converting a contour into a straight line; 88*c*, a tool for making the contour of hair or the like clear; and 88*d*, a tool for making the contour of the selection region nappy. The user can select one of the tools 88*a* to 88*d* of the contour correction tools 88 in correspondence with desired processing contents.

Figure 21:
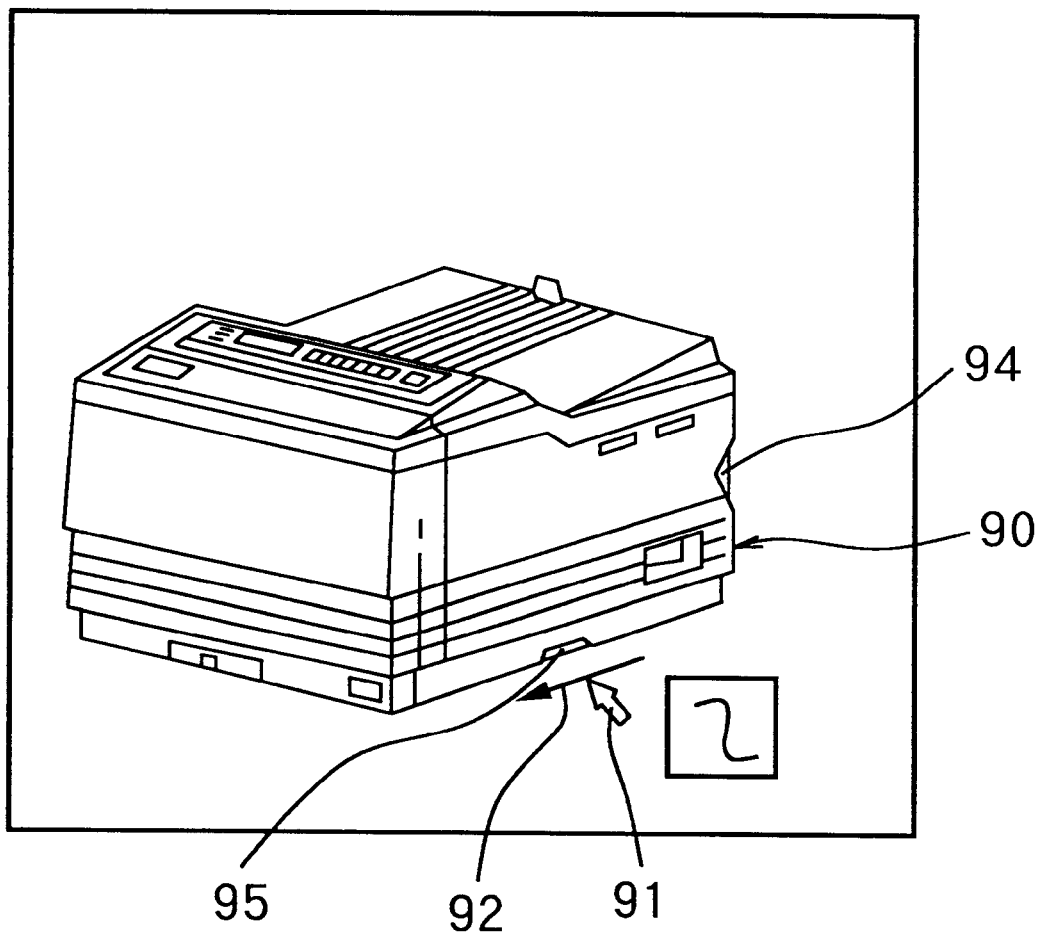
FIG. 21 is an explanatory view of a local region setting method upon using a tool 88 of the third embodiment.

FIG. 21 shows the subject region image displayed on window 1 in FIG. 20 in the enlarged scale. That is, in the subject region image, the contour-shaped subject region is indicated by a bold solid curve 90 in FIG. 21. The user recognizes that this contour has defects at positions 94 and 95.

The user moves a mouse pointer 91 while dragging the mouse along a portion in the vicinity of the contour portion 94 (and 95) of the subject to be corrected (e.g., along an arrow 91 in FIG. 21). The local contour corrector 78 detects the moving range of the mouse pointer, and sets a local region to be corrected.

Upon setting the local region, a method of setting a rectangular region on the basis of the coordinate positions of the upper left and lower right corners of the moving range of the mouse pointer, a method of setting a circle with a certain radius to have the position of the mouse pointer as the center, and selecting, as the local region, a region virtually painted by the circle upon movement of the mouse, or the like can be used. Also, a known method may be used.

When the local region is set, the local contour corrector 78 executes processing corresponding to the type of tool selected by the user.

Figure 22A:
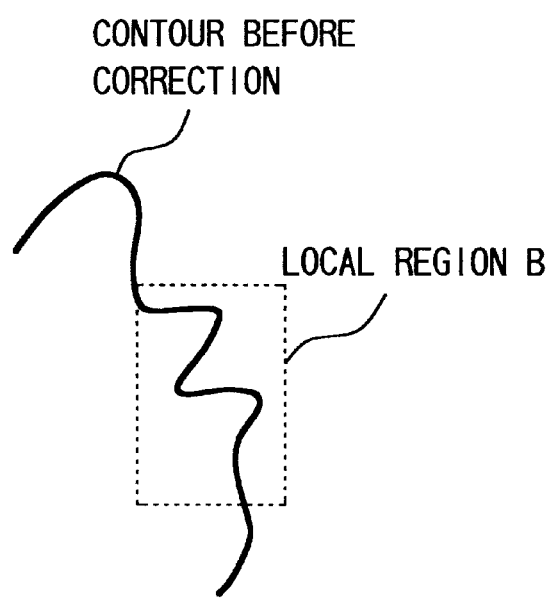
FIGS. 22A and 22B are explanatory views of the processing contents of a tool 88a of the third embodiment.
Figure 22B:
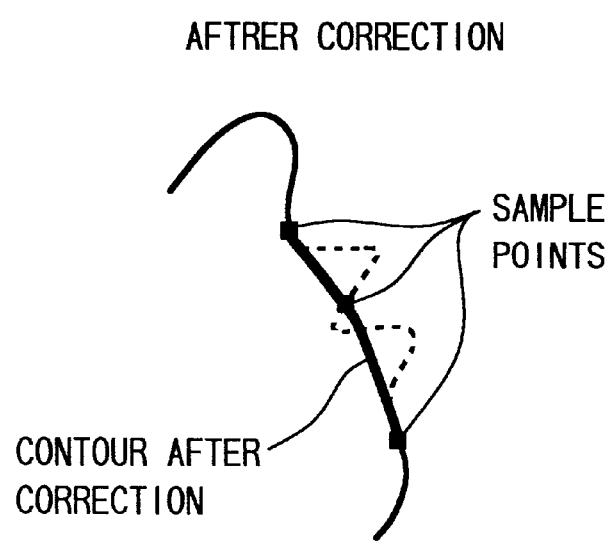

When the smoothing tool 88*a* is selected, sample points are set within local region B, as shown in FIG. 22A to locally generate a fitting curve, thereby smoothing the contour. FIGS. 22A and 22B respectively show the contour before and after correction. With this processing, unnecessary oscillations of the contour can be removed.

Figure 23A:
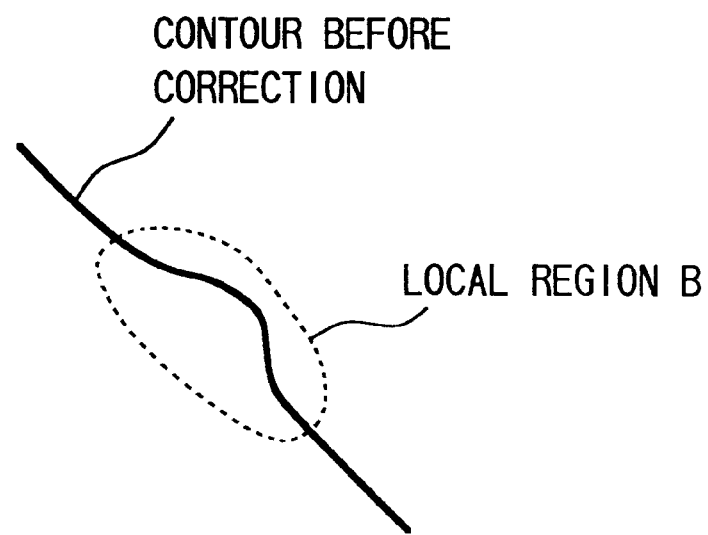
FIGS. 23A and 23B are explanatory views of the processing contents of a tool 88b of the third embodiment.
Figure 23B:
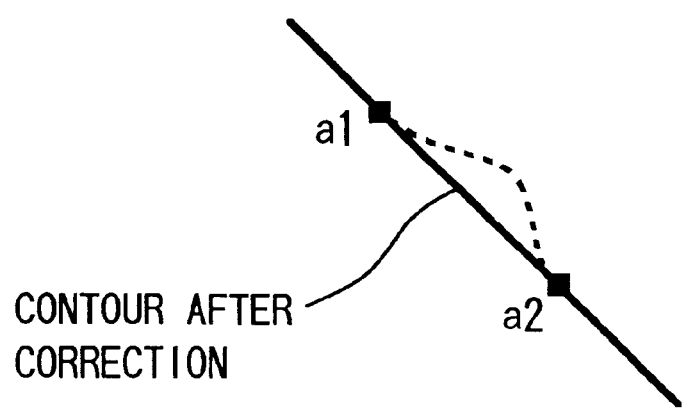

When the straight line tool 88*b* is selected, sample points $a_1$ and $a_2$ are automatically in the vicinity of the two ends of local region B, as shown in FIG. 23A, and are connected by a straight line. With this processing, the contour of the subject having a straight line portion can be clearly extracted. FIGS. 23A and 23B respectively show the contour before and after correction.

Figure 24A:
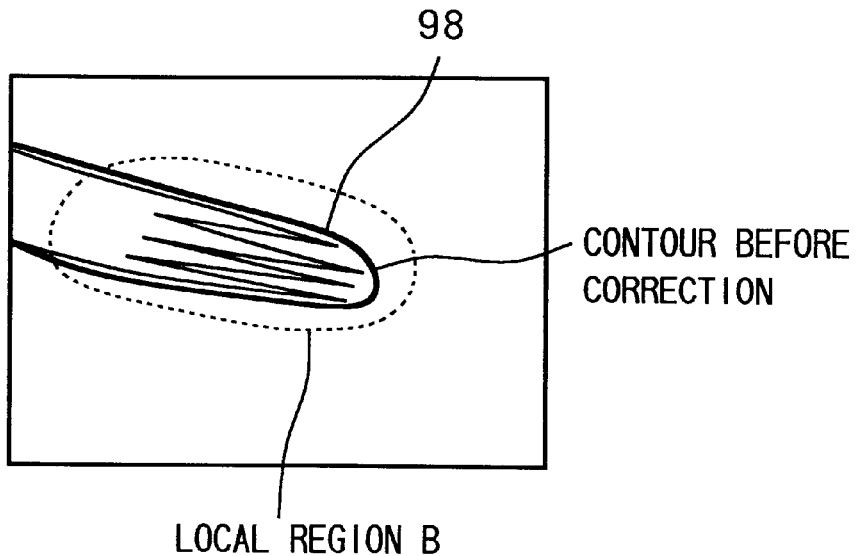
FIGS. 24A and 24B are explanatory views of the processing contents of a tool 88c of the third embodiment.
Figure 24B:
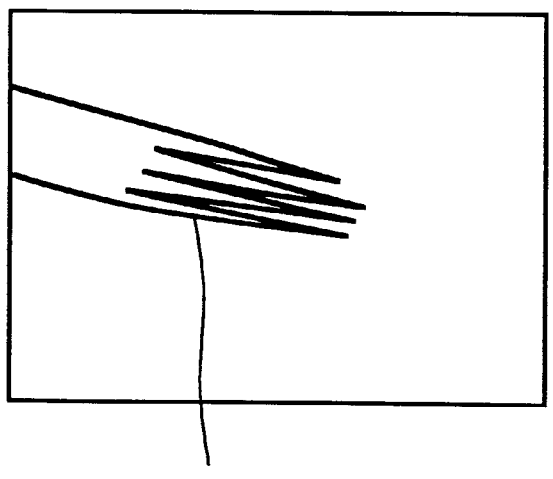

The edge emphasis tool 88*c* is used for extracting a fine shape such as hair. When the edge emphasis tool 88*c* is used, a region whose contour is made clear as hair is recognized as region B by the user's mouse operation. At this time, in region B, hair or the like indicated by the thin solid line bounded by a bold solid curve 98 is captured as an image. The user designates the direction to be emphasized as the direction of hair by dragging the mouse. As a result, edge components in the moving direction of the mouse pointer are emphasized in local region B. FIGS. 24A and 24B respectively show the contour before and after correction. Thereafter, hair or the like can be clearly extracted by region growth and a local fitting curve in local region B.

Figure 25A:
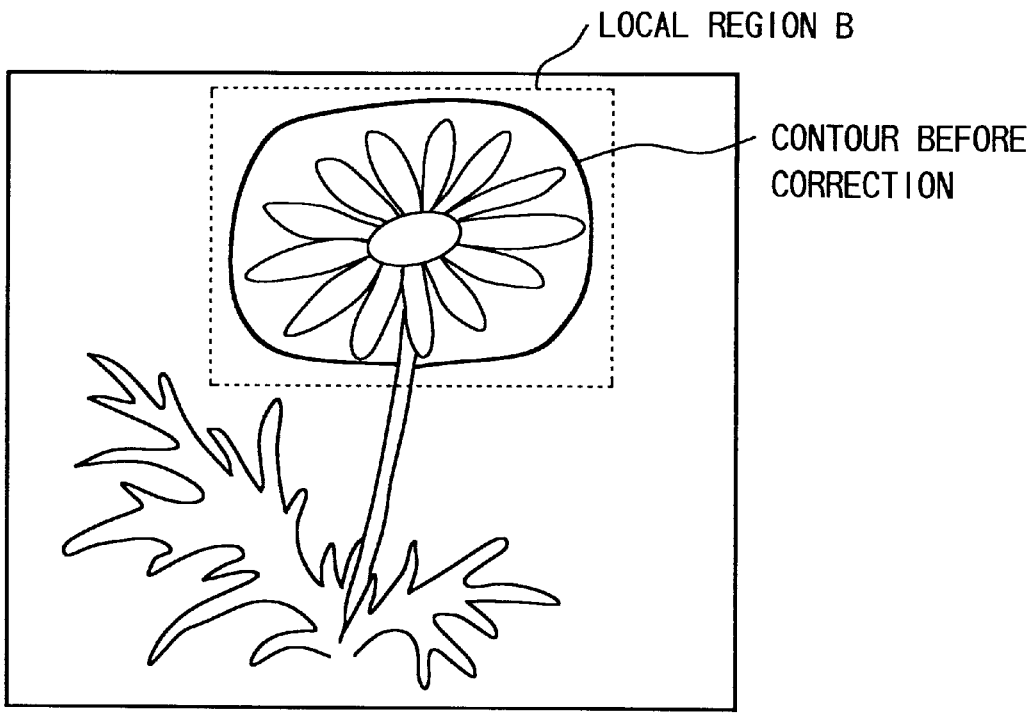
FIGS. 25A and 25B are explanatory views of the processing contents of a tool 88d of the third embodiment.
Figure 25B:
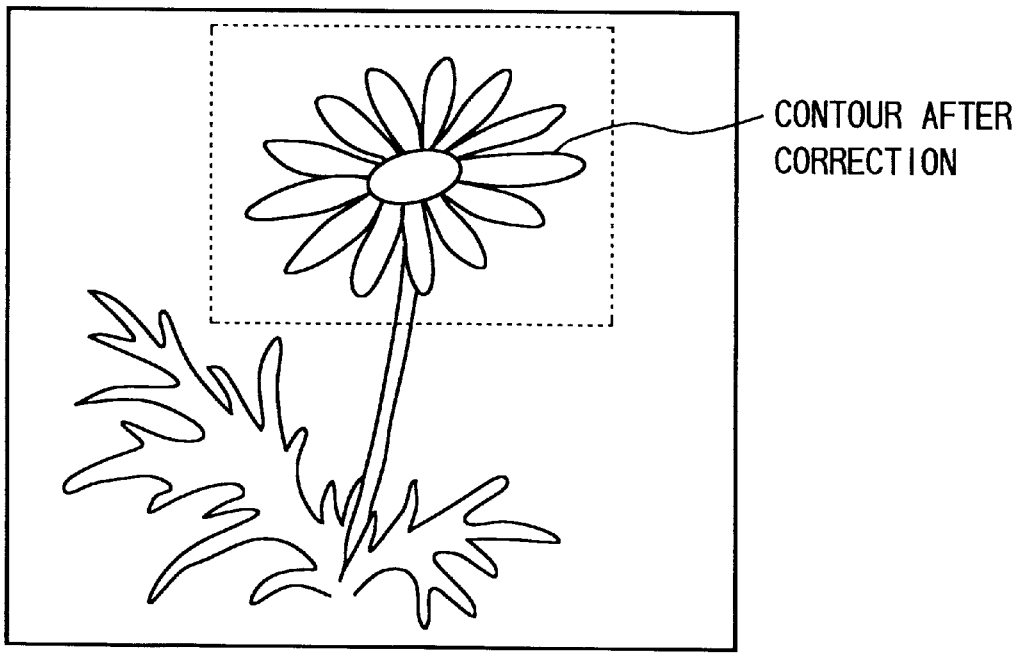

The nappy tool 88*d* is used for making the contour of a local region nappy. When this tool 88*d* is used, a contour with a clear edge is generated. More specifically, as shown in FIG. 25A, region B to be made nappy is designated using a mouse. Within this region B, normalized edge intensities and differences of RGB values in directions perpendicular to the directions of contour at the individual search point are calculated while searching on the contour already obtained by region growth. The subject contour is corrected using an evaluation function that suppresses region growth at an edge portion on the basis of the calculated intensities and differences. FIGS. 25A and 25B respectively show the contour before and after correction.

Since the above-mentioned correction is automatically executed in the local region, the need for cumbersome manual re-drawing of a contour can be obviated.

Figure 26:
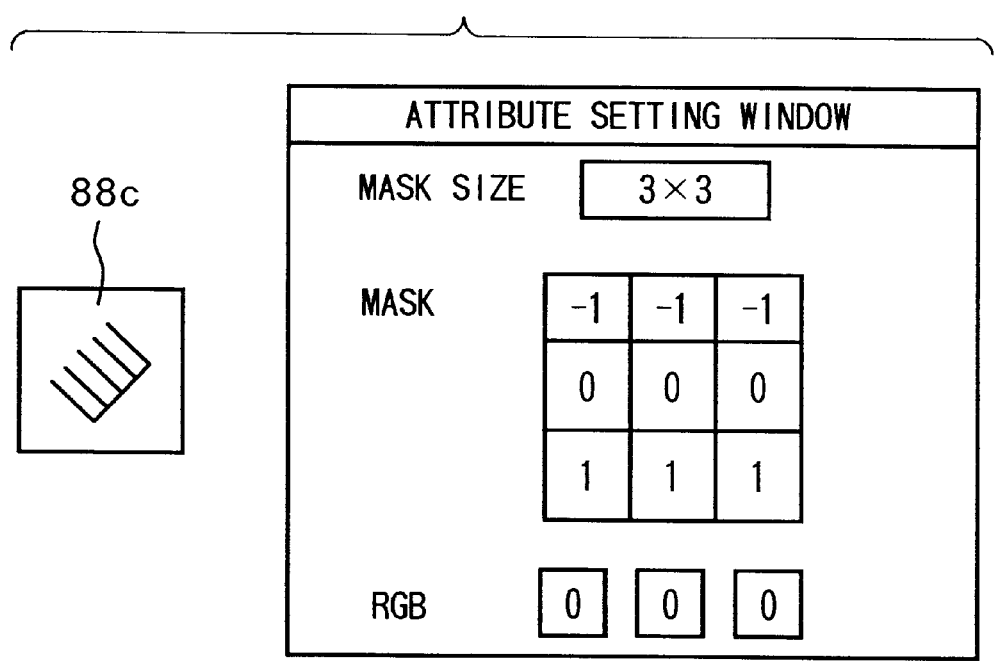
FIG. 26 shows an example of an attribute setting window of the contour correction tool 88c.

In the third embodiment, the user selects one of the tools prepared in advance in correspondence with desired processing contents. Alternatively, after the processing contents are selected using a menu or the like, a local region may be set by a versatile local region setting tool, and the above-mentioned processing operations may be simultaneously executed. As an option of each tool, an attribute setting menu shown in FIG. 26 may be prepared. For example, a black region, i.e., a region having RGB values close to zero is set as the attribute of the tool 88*c* to emphasize only edge components approximate to black. Furthermore, the user may arbitrarily set the processing contents, attributes, and the like to generate a user-defined custom tool.

Using the above-mentioned local processing tools, a desired contour can be automatically generated within a local region, and a subject region can be extracted.

In the above-mentioned embodiment, an image is input from the camera. Alternatively, an image stored in a storage medium, storage unit, or the like may be read, and a series of processing operations described above may be executed.

The processing of the extraction apparatus according to the first to third embodiments can be executed by loading a program stored in an FD, magnetic disk, CD-ROM, or the like onto a predetermined memory in the extraction apparatus.

As many apparently widely different embodiments of the present invention can be made without departing from the spirit and scope thereof, it is to be understood that the invention is not limited to the specific embodiments thereof except as defined in the appended claims.

What is claimed is:

1. A method of extracting a region of a subject image from an input image including the subject image, comprising:

a first mask generation step of providing an initial mask to the subject image;

a second mask generation step of generating a subject region mask for masking the region of the subject image by performing a predetermined process to the initial mask;

a contour shaping step of shaping a contour of the subject region mask;

a region setting step of setting local regions for correcting the contour shaped in the contour shaping step on the basis of information of the contour of the subject region mask before and after shaping in the contour shaping step; and a correction step of correcting the contour of the subject region mask shaped in the contour shaping step within the local regions set in the region setting step.

2. The method according to claim 1, wherein the mask generation step comprises:

the calculation step of calculating a difference between the input image and a background image input independently of the input image; and the step of generating the subject region mask from the input image in accordance with the difference image calculated in the calculation step.

3. The method according to claim 1, wherein the contour shaping step includes the step of setting sample points used for contour shaping on the basis of a direction of the contour of the subject region mask.

4. An image extraction apparatus for extracting a region of a subject image from an input image including the subject image, comprising:

generation means for generating a subject region mask for masking the region of the subject region of the subject image from the input image by performing a predetermined process to an initial mask provided on the subject image;

shaping means for shaping a contour of the subject region mask;

setting means for setting local regions for correcting the contour shaped by said shaping means on the basis of information of the contour of the subject region mask before and after shaping by said shaping means; and correction means for correcting the contour of the subject region mask shaped by said shaping means within the local regions by said setting means.

5. The apparatus according to claim 4, wherein said generation means comprises:

calculation means for calculating a difference between the input image and a background image input independently of the input image; and means for generating the subject region mask from the input image in accordance with the difference image calculated by said calculation means.

6. The apparatus according to claim 4, wherein said shaping means sets sample points used for contour shaping on the basis of a direction of the contour of the subject region mask.

7. An image extraction method comprising:

a region segmentation step of segmenting an input image into a plurality of small regions;

a labeling step of assigning a label for identification to each of the plurality of small regions obtained in the region segmentation step;

a subject region mask generation step of generating a desired subject region mask from the input image;

a contour shaping step of shaping a contour of the subject region mask generated in the subject region mask generation step;

a display step of displaying the contour of the subject region mask shaped in the contour shaping step, the contour being displayed to be superposed on the input image, a local correction point designation step of designating, on a displayed image, local correction points of the contour of the subject region mask shaped in the contour shaping step; and a contour correction step of correcting the contour of the subject region mask by performing local processing in units of labels including the points designated in the local correction point designation step.

8. The method according to claim 7, wherein the subject region mask generation step comprises:

the image difference calculation step of calculating a difference between the input image and a background image input independently of the input image; and the mask generation step of generating the subject region mask from the input image in accordance with the difference image calculated in the image difference calculation step.

9. An image extraction apparatus comprising:

region segmentation means for segmenting an input image into a plurality of small regions;

labeling means for assigning a label for identification to the plurality of small regions obtained by said region segmentation means;

subject region mask generation means for generating a desired subject region mask from the input image;

contour shaping means for shaping a contour of the subject region mask generated by said subject region mask generation means;

display means for displaying the contour of the subject region mask shaped by said contour shaping means, the contour being displayed to be superposed on the input image;

local correction point designation means for designating, on a displayed image, local correction points of the contour of the subject region mask shaped by said contour shaping means; and contour correction means for correcting the contour of the subject region mask by performing local processing in units of labels including the points designated by said local correction point designation means.

10. The apparatus according to claim 9, wherein said subject region mask generation means comprises:

image difference calculation means for calculating a difference between the input image and a background image input independently of the input image; and mask generation means for generating the subject region mask from the input image in accordance with the difference image calculated by said image difference calculation means.

11. An image extraction method comprising:
a subject region mask generation step of providing an initial mask on an input image and generating a desired subject region mask by performing a predetermined process to the initial mask;
a display step of displaying a contour of the subject region mask generated in the subject region mask generation step to be superposed on the input image;
a local region setting step of setting an arbitrary local region for correcting the contour of the subject region mask on a display screen;
a processing selection step of selecting processing to be executed within the local region; and
a correction step of correcting the subject region mask within the local region in accordance with the processing selected in the processing selection step.

12. The method according to claim 11, wherein the correction step includes the step of executing the selected processing within the designated local region in accordance with a moving path and direction of predetermined pointing means.

13. An image extraction apparatus comprising:
subject region mask generation means for providing an initial mask on an input image and generating a desired subject region mask by performing a predetermined process to the initial mask;
display means for displaying a contour of the subject region mask generated by said subject region mask generation means to be superposed on the input image;
local region setting means for setting an arbitrary local region for correcting the contour of the subject region mask on a display screen;
processing selection means for selecting processing to be executed within the local region; and
correction means for correcting the subject region mask within the local region in accordance with the processing selected by said processing selection means.

14. The apparatus according to claim 13, further comprising pointing means for setting the local region on the display screen of said display means, and wherein said correction means executes the selected processing within the designated local region in accordance with a moving path and direction of said pointing means.

15. A storage medium storing a program which can be executed by a computer to extract a region of a subject image from an input image including the subject image, comprising:
a first mask generating step of providing an initial mask to the subject image;
a second mask generation step of generating a subject region mask for masking by performing a predetermined process to the initial mask;
a contour shaping step of shaping a contour of the subject region mask;
a region setting step of setting local regions for correcting the contour shaped in the contour shaping step on the basis of information of the contour of the subject region mask before and after shaping in the contour shaping step; and
correction step of correcting the contour of the subject region mask shaped in the contour shaping step within the local regions set in the local region setting step.

16. A storage medium storing a program which can be executed by a computer to extract a region of a subject image from an input image including the subject image, comprising:
a region segmentation step of segmenting an input image into a plurality of small regions;
a labeling step of assigning labels for identifying the small regions obtained in the region segmentation step to the small regions;
a subject region mask generation step of generating a desired subject region mask from the input image;
a contour shaping step of shaping a contour of the subject region mask generated in the subject region mask generation step;
a display step of displaying, the contour of the subject region mask shaped in the contour shaping step to be superposed on the input image;
a local correction point designation step of designating, on a displayed image, local correction points of the contour of the subject region mask shaped in the contour shaping step; and
a contour correction step of correcting the contour of the subject region mask by performing local processing in units of labels including the points designated in the local correction point designation step.

17. A storage medium storing a program which can be executed by a computer to extract a region of a subject image from an input image are including the subject image, comprising:
a subject region mask generation step of providing an initial mask on an input image and generating a desired subject region mask by performing a predetermined process to the initial mask;
a display step of displaying a contour of the subject region mask generated in the subject region mask generation step to be superposed on the input image;
a the local region setting step of setting an arbitrary local region for correcting the contour of the subject region mask on a display screen;
a processing selection step of selecting processing to be executed within the local region; and
a correction step of correcting the subject region mask within the local region in accordance with the processing selected in the processing selection step.

18. An image extraction apparatus for extracting a region of a subject image from an input image, comprising:
generation means for generating a subject region mask using difference image calculation for masking the region of the subject region of the input image by performing a predetermined process to an initial mask provided on the input image
shaping means for shaping a contour of the subject region mask;
setting means for setting local regions for correcting the contour shaped by said shaping, means on the basis of information of the contour of the subject region mask before and after the shaping by said shaping means occur; and
correction means for correcting the contour of the subject region mask shaped by said shaping means within the local regions by said shaping means.

* * * * *

UNITED STATES PATENT AND TRADEMARK OFFICE
CERTIFICATE OF CORRECTION

PATENT NO.    : 6,404,936 B1  
DATED         : June 11, 2002  
INVENTOR(S)   : Tatsushi Katayama et al.

It is certified that error appears in the above-identified patent and that said Letters Patent is hereby corrected as shown below:

Column 9,  
Line 5, please delete "S2L" and insert therefore -- S21 --  
Line 41, please add -- it -- in front of "is"

Column 17,  
Line 63, please add -- a -- in front of "correction"

Column 18,  
Line 38, please delete "the"

Signed and Sealed this

Tenth Day of June, 2003

JAMES E. ROGAN  
*Director of the United States Patent and Trademark Office*